(12) United States Patent
Gordon et al.

(10) Patent No.: US 7,032,176 B2
(45) Date of Patent: Apr. 18, 2006

(54) METHOD AND APPARATUS FOR PROVIDING A MENU STRUCTURE FOR AN INTERACTIVE INFORMATION DISTRIBUTION SYSTEM

(75) Inventors: Donald Gordon, Pacific Grove, CA (US); Christopher Goode, Menlo Park, CA (US); Philip A. Thomas, San Jose, CA (US); Mark D. Conover, Cupertino, CA (US); Brooks Cole, Point Reyes Station, CA (US)

(73) Assignee: Sedna Patent Serivces, LLC, Philadelphia, PA (US)

( * ) Notice: Subject to any disclaimer, the term of this patent is extended or adjusted under 35 U.S.C. 154(b) by 536 days.

(21) Appl. No.: 09/781,483

(22) Filed: Feb. 12, 2001

(65) Prior Publication Data
US 2001/0019336 A1 Sep. 6, 2001

Related U.S. Application Data

(62) Division of application No. 08/984,427, filed on Dec. 3, 1997, now Pat. No. 6,208,335.

(60) Provisional application No. 60/034,490, filed on Jan. 13, 1997.

(51) Int. Cl.
*G09G 5/00* (2006.01)

(52) U.S. Cl. ............. 715/719; 715/716; 725/39; 725/61; 725/52

(58) Field of Classification Search ........ 345/716–723, 345/748, 749, 761–765; 348/563, 731, 570, 348/331; 715/716–723, 748, 749, 761–765; 725/37, 39, 43, 61, 47–52, 91, 93, 27
See application file for complete search history.

(56) References Cited

U.S. PATENT DOCUMENTS

| 4,706,121 A | 11/1987 | Young .................. 358/142 |
| 4,751,578 A | 6/1988 | Reiter et al. ............ 358/183 |
| 4,860,123 A | 8/1989 | McCalley et al. ........ 358/342 |
| 4,885,775 A | 12/1989 | Lucas .................... 380/10 |
| 4,908,713 A | 3/1990 | Levine .................. 358/335 |
| 4,991,011 A | 2/1991 | Johnson et al. .......... 358/141 |
| 5,038,211 A | 8/1991 | Hallenbeck ............. 358/142 |
| 5,070,400 A | 12/1991 | Lieberman .............. 358/84 |
| 5,151,789 A | 9/1992 | Young .................. 358/194.1 |
| 5,182,640 A | 1/1993 | Takano ................. 358/86 |
| 5,307,173 A | 4/1994 | Yuen et al. ............. 358/335 |

(Continued)

OTHER PUBLICATIONS

Videotape Showing TV-Guide online product (May 19, 1994).

*Primary Examiner*—Tadesse Hailu
(74) *Attorney, Agent, or Firm*—Patterson & Sheridan, LLP

(57) ABSTRACT

A method and apparatus for providing an interactive menu structure within an interactive information distribution system. The menu structure is embodied in a combination of software, which provides a so-called navigator and a set top terminal that provides certain functionality for the navigator and a video session manager which provides support functionality for the set top terminal. The menu structure has each menu (e.g., menu instructions, graphics and video) contained in downloadable applets which are sent upon request from the service provider equipment to the set top terminal for display. As such, the navigator functions are actually distributed between the service provider equipment and the subscriber's equipment. Such distribution provides an enjoyable, real-time interactive session that allows the user to rapidly navigate through a plethora of menus to find particular information, which they desire to view.

64 Claims, 20 Drawing Sheets

U.S. PATENT DOCUMENTS

| | | | |
|---|---|---|---|
| 5,357,276 A | 10/1994 | Banker et al. | 348/7 |
| 5,359,601 A | 10/1994 | Wasilewski et al. | 370/73 |
| 5,400,402 A | 3/1995 | Garfinkle | 380/20 |
| 5,410,367 A | 4/1995 | Zahavi et al. | 348/725 |
| 5,477,262 A | 12/1995 | Banker et al. | 346/7 |
| 5,479,266 A | 12/1995 | Young et al. | 358/335 |
| 5,479,268 A | 12/1995 | Young et al. | 358/335 |
| 5,485,197 A | 1/1996 | Hoarty | 348/7 |
| 5,508,815 A | 4/1996 | Levine | 358/335 |
| 5,515,106 A | 5/1996 | Chaney et al. | 348/461 |
| 5,530,754 A | 6/1996 | Garfinkle | 380/5 |
| 5,532,754 A | 7/1996 | Young et al. | 348/569 |
| 5,550,576 A | 8/1996 | Klosterman | 348/6 |
| 5,568,272 A | 10/1996 | Levine | 386/48 |
| 5,583,560 A | 12/1996 | Florin et al. | 348/7 |
| 5,585,838 A | 12/1996 | Lawler et al. | 348/13 |
| 5,585,866 A | 12/1996 | Miller et al. | 348/731 |
| 5,594,509 A | 1/1997 | Florin et al. | 348/731 |
| 5,596,373 A | 1/1997 | White et al. | 348/569 |
| 5,619,249 A | 4/1997 | Billock et al. | 348/7 |
| 5,625,406 A | 4/1997 | Newberry et al. | 348/7 |
| 5,644,354 A | 7/1997 | Thompson et al. | 348/13 |
| 5,710,601 A | 1/1998 | Marshall et al. | 348/564 |
| 5,812,123 A | 9/1998 | Rowe et al. | 345/327 |
| 5,822,123 A * | 10/1998 | Davis et al. | 725/43 |
| 5,903,816 A | 5/1999 | Broadwin et al. | 455/3.1 |
| 5,933,141 A | 8/1999 | Smith | 345/339 |
| 5,966,162 A | 10/1999 | Goode et al. | 348/10 |
| 5,987,245 A | 11/1999 | Gish | 395/680 |
| 6,002,394 A | 12/1999 | Schein et al. | 345/327 |
| 6,006,256 A | 12/1999 | Zdepski et al. | 709/217 |
| 6,016,144 A * | 1/2000 | Blonstein et al. | 345/791 |
| 6,018,372 A | 1/2000 | Etheredge | 348/569 |
| 6,025,837 A * | 2/2000 | Matthews et al. | 345/721 |
| 6,049,831 A * | 4/2000 | Gardell et al. | 709/236 |
| 6,061,097 A | 5/2000 | Satterfield | 348/569 |
| 6,064,376 A | 5/2000 | Berezowski et al. | 345/327 |
| 6,160,546 A | 12/2000 | Thompson et al. | 345/327 |
| 6,163,316 A * | 12/2000 | Killian | 345/721 |
| 6,172,674 B1 | 1/2001 | Etheredge | 345/327 |
| 6,212,680 B1 | 4/2001 | Tsinberg et al. | 725/39 |
| 6,263,501 B1 | 7/2001 | Schein et al. | 725/39 |
| 6,357,046 B1 | 3/2002 | Thompson et al. | 725/139 |
| 6,415,437 B1 | 7/2002 | Ludvig et al. | 725/41 |
| 6,473,804 B1 | 10/2002 | Kaiser et al. | 709/245 |
| 6,481,010 B1 | 11/2002 | Nishikawa et al. | 725/44 |

\* cited by examiner

METHOD AND APPARATUS FOR PROVIDING A MENU STRUCTURE FOR AN INTERACTIVE INFORMATION DISTRIBUTION SYSTEM

CROSS-REFERENCE TO RELATED APPLICATIONS

This application is a divisional of co-pending U.S. patent application Ser. No. 08/984,427, filed Dec. 3, 1997, and assigned to the same assignee as this application, which co-pending application claims benefit of U.S. provisional patent application Ser. No. 60/034,490, filed Jan. 13, 1997; the disclosures of U.S. provisional application Ser. No. 60/034,490, filed Jan. 13, 1997, and U.S. patent application Ser. No. 08/984,427, filed Dec. 3, 1997, are herein incorporated by reference.

BACKGROUND OF THE INVENTION

1. Field of the Invention

The present invention relates to an interactive information distribution system such as a video-on-demand (VOD) system. More particularly, the present invention relates to a method and apparatus for providing an interactive menu structure, i.e., an on-screen program guide, for such an interactive information distribution system.

2. Description of the Background Art

Recent advances in digital signal processing techniques, and in particular, improvements in digital compression techniques, have led to a plethora of proposals for providing new digital services to a customer's home via existing telephone and coaxial cable networks. For example, it has been proposed to provide hundreds of cable television channels to subscribers by compressing digital data, digital video, transmitting compressed digital video over conventional coaxial cable television channels, and then decompressing the video in the subscriber's set top terminal. Another proposed application for this technology is a video-on-demand system in which a subscriber communicates directly with a video service provider via telephone lines to request a video program from a video library and the requested video program is routed to the subscriber's home via telephone lines or via coaxial cable television cables for immediate viewing. Other proposed video-on-demand systems use a frequency multiplexing technique to enable control information for a set top terminal to be transmitted through a cable network back to an information server. Such a system permits bi-directional communication over a single network.

In each of these information distribution systems, menus are displayed upon the subscriber's television and using a remote control device, a subscriber selects a desired program for viewing. A program code is then sent from the set top terminal through the communication system back to the service provider. The selected program is then recalled from memory by the service provider equipment and broadcast to the set top terminal that requested that information. Alternatively, the subscriber may telephone the service provider and request certain information that is displayed in a menu upon the subscriber's television or the subscriber's set top terminal or television set may automatically tune, in response to the menu selection, to a broadcast channel to receive information transmitted on that channel. In any event, the currently available systems generally do not provide an interactive menu structure through which to select programming. Usually the menus are rudimentary text listings of available programs. By scrolling through the lists of programs using a remote control device the user selects desired programming. These text-based menus do not contain any graphics, video, or other material that would provide an entertaining interactive session. Two such systems are disclosed in U.S. Pat. No. 5,357,276 issued Oct. 18, 1994 and U.S. Pat. No. 5,477,262 issued Dec. 19, 1995.

Therefore, there is a need in the art for a method and apparatus for providing an improved interactive menu structure for an interactive information distribution system.

SUMMARY OF THE INVENTION

The disadvantages heretofore associated with the prior art are overcome by the present invention of a method and apparatus for providing an improved interactive menu structure for an on-screen program guide within an interactive information distribution system. The invention is embodied in a combination of software, which provides a so-called "navigator," and hardware, including a set top terminal that provides certain functionality for the navigator and a video session manager which supports the functionality of the set top terminal. As such, the navigator functions are distributed between service provider equipment (video session manager) and subscriber equipment (set top terminal). Such distribution provides an enjoyable, real-time interactive session that allows the subscriber to rapidly navigate through a plethora of menus to find particular information, which the subscriber desires to view.

More specifically, the interactive information distribution system comprises service provider equipment connected to subscriber equipment through a communications network. The service provider equipment includes an information server coupled co a video session manager. The video session manager contains a modulator for modulating information provided by the server into a form that can be transmitted through the network to the subscriber equipment. The video session manager also contains a modem for communicating command and control information between the service provider equipment and subscriber equipment.

The subscriber equipment includes a set top terminal that is connected to a display device such as a television and an input device such as an infrared (IR) or radio-frequency (RF) remote control. The user while viewing the display device may select a number of menus using the input device as the menus are presented from the set top terminal upon the television screen. Any commands which the user transmits to the set top terminal that are not handled by the set top terminal itself are communicated through the network to the service provider equipment, demodulated by the modem and implemented by the video session manager. The video session manager forms an interface between the modem and the server such that the video session manager may coordinate billing, ensure that proper programming is sent through the network and addressed properly to the set top terminal requesting that programming, and interact with the server.

A navigator menu structure is a series of interconnected "applets" (e.g., a linked list of programs). Each applet contains certain data for producing interactive menu imagery (screen) as well as control instructions that provide functionality for the menu. The applet data generally contains two components. There are the underlying video images (background video) which provides so-called entertaining "eye candy" and selectable icons for the viewer. Additionally, there is an overlay screen, which provides the interactive functionality and command structure for the navigator. The overlay screen is produced using the on-screen display (OSD) functions of a video decoder within the set top terminal. Particular applets are sent through the network to the set top terminal in response to a particular command from the subscriber.

Specifically, when a subscriber selects a functional icon within a given menu, an applet for a new menu corresponding to the selected icon is downloaded from the server through the modem and the network to the set top terminal. The applet is contained in a compressed, packetized video stream. This stream conforms to the compression and transport protocols of a standard video transmission protocol such as the Moving Pictures Experts Group (MPEG) protocol.

As soon as the background video associated with the applet is available for display, the video decoder displays the video on the television screen. Additionally, the OSD overlay(s) are displayed "over" the background video. These OSD graphics facilitate certain interactive functions such that when the user manipulates a joystick or other selection instrument particular regions are visibly altered, e.g., the regions become highlighted. The user then selects a highlighted region for implementation of a function represented by the highlighted region. The region generally changes in some manner indicating that that graphic has been selected. The display of the overlays is handled by a microprocessor within the set top terminal as well as an on-screen display graphics processor within the video decoder of the set top terminal. Selecting a region or icon on the screen will send a command to the video session manager for implementation. In response, the video session manager sends a new applet representing another menu (e.g., the next applet in the linked list) or a multimedia selection such as a movie.

The navigator menu structure may be conveniently described in terms of a video layer, a graphics layer and a control layer. The video layer comprises the displayed video images produced using, e.g., information contained in an applet. The graphics layer comprises OSD overlay(s) including graphical objects which are associated with applets stored in either subscriber or provider equipment. The OSD overlay(s) are displayed over the video layer. As such, the OSD layer can be used to emphasize and de-emphasize the underlying video. In particular, the graphics can be transparent (or have some level of transparency) to allow much of the underlying video to be seen while positioning certain graphics upon the video, and/or the OSD graphics can be opaque such that, by turning the graphics on and off the underlying video is either masked or revealed. The control layer comprises a command processing and logical operations layer. The control layer retrieves the applets associated with graphic layer objects selected by a user, executes the applets, provides video information to the video layer and objects information to the graphics layer.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

The invention is a method and apparatus that provides an improved interactive menu structure for an on-screen program guide for use with an information distribution system. The inventive menu structure shall hereinafter be referred to as a "navigator". Although the navigator of the present invention can be implemented and executed using a number of different types of information distribution system; the preferred embodiment is used in combination with the hardware described below. The interactive information distribution system described below is disclosed in detail in U.S. provisional patent application No. 60/034,489 filed Jan. 13, 1997 and incorporated herein by reference. However, this specific hardware arrangement is considered illustrative of the type of system with which the invention is used. Any other hardware arrangement that facilitates information distribution is considered within the scope of the invention.

Figure 1:
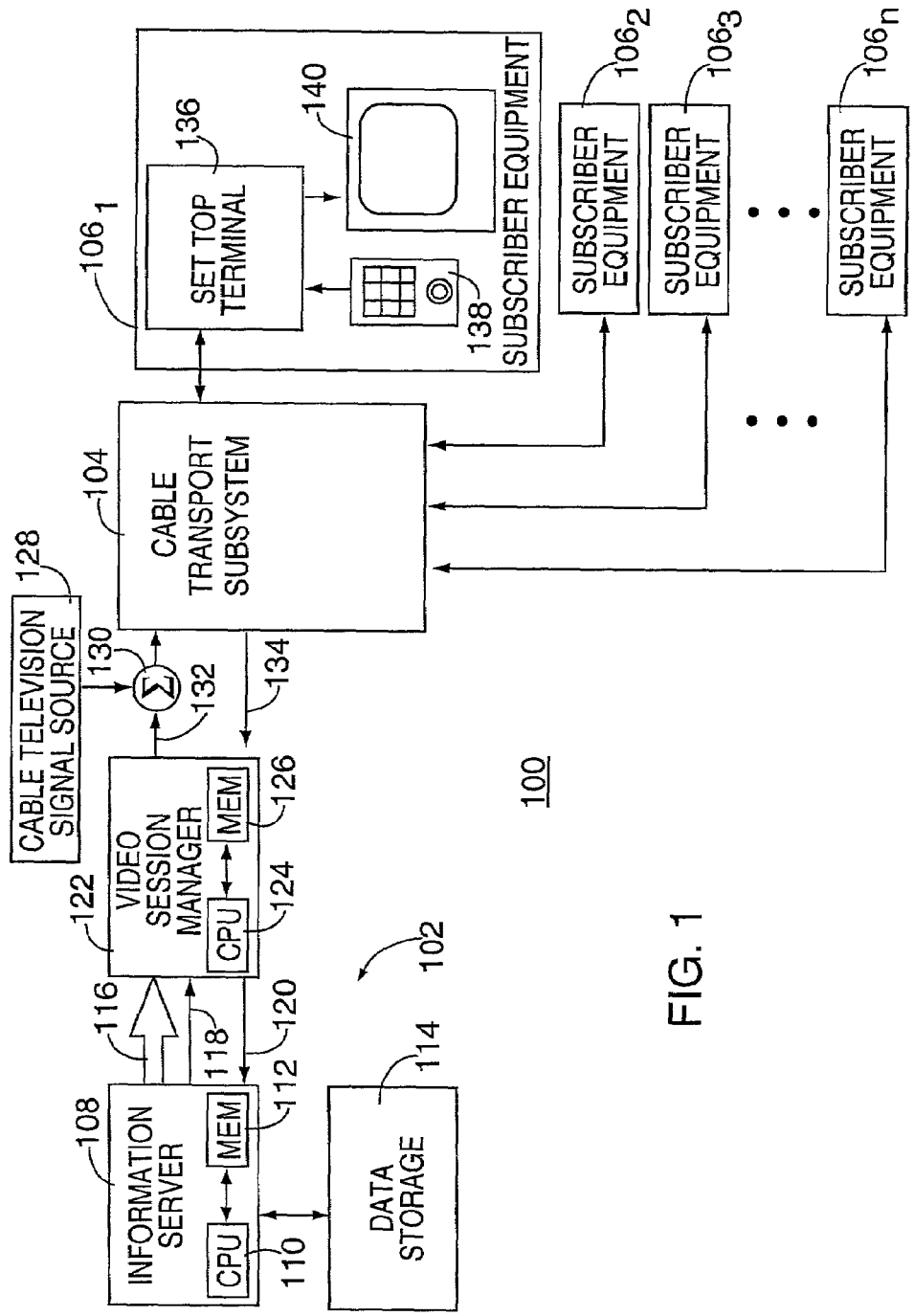
FIG. 1 depicts a high level block diagram of an interactive information distribution system containing the present invention.

FIG. 1 depicts a high level block diagram of the illustrative information distribution system 100 that incorporates the present invention. The system contains service provider equipment 102, a communications network 104 and subscriber equipment 106$_n$, where n is an integer greater than zero. The service provider equipment 102 contains an information server 108 which is typically a parallel processing computer containing at least one central processing unit 110 and associated memory 112. The server interacts with a data storage device 114 (e.g., a disk drive array) that generally stores the subscriber information (e.g., video data) that will be recalled and downloaded to the subscriber. Additionally, within the service provider equipment is a video session manager 122 that provides session control of the information flowing to and from the server. Furthermore, the video session manager 122 contains its own central processing unit 124 and associated memory 126.

The information server 108 is coupled to the video session manager via data path 116, synchronization clock path 118 and control path 120. The server 108 provides data streams on path 116 and a synchronization clock on path 118 in response to requests for information from the video session manager on path 120. These data streams are packetized and modulated onto a carrier that is compatible with the transmission requirements of the network 104.

The video session manager 122 accomplishes all of the transmission interface requirements of the system 100. Specifically, the video session manager 122 is coupled to subscriber equipment via a forward information channel 132, a forward command channel 133 and a back channel 134. All three of these channels are supported by the cable transport network 104. The video session manager 122 contains a modulator for modulating the server data streams onto one or more carrier frequencies for transmission on the forward information channel 132. Additionally, the video session manager 122 contains a modem for sending control information via the forward command channel 133 and receiving control information via the back channel 134. Moreover, a conventional cable television signal source 128 is optionally coupled to the forward information channel 132 via a signal coupler 130.

The network 104 can be any one of a number of conventional broadband communications networks that are available such as a fiber optic network, a telephone network, existing cable television network and the like. For example, if the network is a hybrid fiber-coax network, the transmission transport technique used in both forward channels may be modeled after the Moving Pictures Expert Group (MPEG) transport protocol for the transmission of video data streams. In general, the transport mechanism for both of the forward channels that transport information to the set top terminal must be able to carry unidirectional, asynchronous packetized data such as that defined in the MPEG video and audio signal transmission protocol, and the like. There are a number of such transport protocols available.

Each set top terminal 106 receives the data streams from the forward information channel, demodulates those streams and processes them for display on the display device 140 (e.g., a conventional television). In addition, the set top terminal 106 accepts commands from a remote control input device 138 or other input device. These commands are formatted, compressed, modulated, and transmitted through the network 104 to the video session manager 122. Typically, this transmission is accomplished through the back channel 134. These commands are preferably transmitted through the same network used to transmit information to the set top terminal. However, the back channel coupling the set top terminal to the server may be a separate network, e.g., a forward information channel through a television cable network and a back channel through a telephone network. The telephone network could also support the forward control channel. The video session manager 122 interprets each command sent from the set top terminal through the back channel and instructs the information server to perform certain functions to implement the subscriber request.

Figure 2:
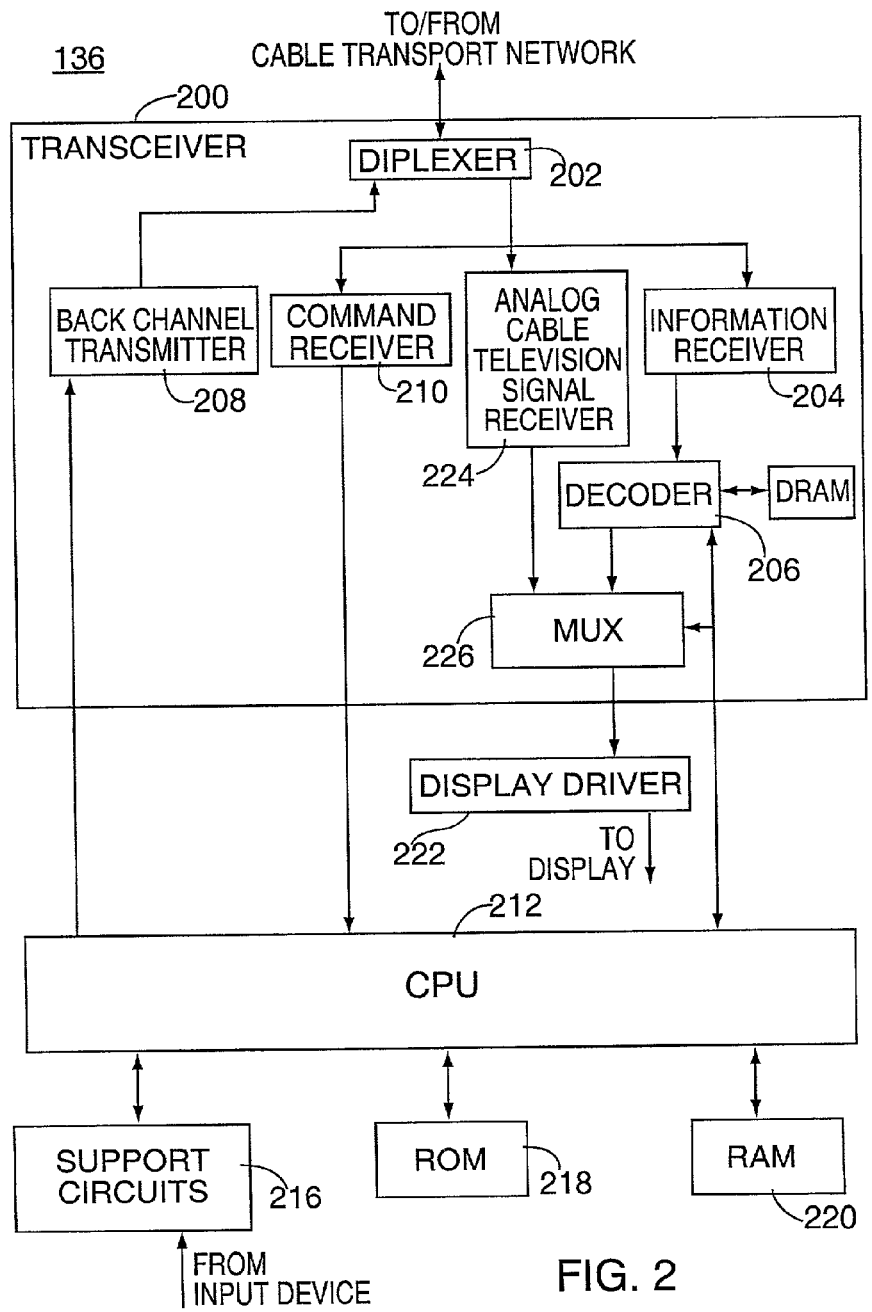
FIG. 2 depicts a block diagram of an illustrative set top terminal within the system of FIG. 1.

FIG. 2 depicts a block diagram of the set top terminal 136 which contains a transceiver 200, a central processing unit (CPU) 212 and a display driver 222. Of course, the functionality of the set top terminal 136 can be embedded within a single consumer electronics product such a television. As such, the description of a stand-alone set top terminal should be considered illustrative of the type of subscriber equipment that may be used to implement the present invention. Within the set top terminal 136, the CPU 212 is supported by random access memory (PAM) 220, read only memory (ROM) 218 and various support circuits 216 such as clocks, power supply, an infrared receiver and the like. The transceiver 200 contains a diplexer 202, a back channel transmitter 208, an information channel receiver 204, a command channel receiver 210, an information decoder 206, a conventional television signal receiver 224, and a multiplexer 226. The diplexer 202 couples the three channels carried by a single cable within the network to the transmitter and receivers.

Each receiver 204 and 210 contains a tuner, amplifiers, filters, a demodulator, and a depacketizer. As such, the receivers tune, downconvert, and depacketize the signals from the cable network in a conventional manner. The information channel receiver 204 contains a conventional QAM demodulator such as a model BCM3115 manufactured by the Broadcom Corporation. Other such demodulators are well-known in the communications arts and could be used in this application. However, this particular QAM demodulator also contains a built in "out-of-band" QPSK demodulator for handling command channel data carried by the forward command channel. As such, a single integrated circuit demodulates both subscriber requested information (audio and video) as well as command data.

The decoder 206 processes the data packets carrying subscriber requested information produced by the QAM demodulator into useable signals for the end user display, e.g., television, home studio, video recorder and the like. The decoder is coupled to a dynamic random access memory (DRAM) to facilitate decoding of the data packets and processing of applets, as shall be discussed below. The signals for display are conventionally processed by a display driver 222 to produce composite video as well as a conventional television signal, e.g., modulated onto channel 3 or 4 using the NTSC standard modulation.

The conventional cable television signal receiver 224 contains a tuner and an analog (NTSC) demodulator. A multiplexer 226 couples the demodulated analog or decoded video signal to the display drive 222. Of course, the NTSC demodulator can be replaced with a PAL or SECAM standard demodulator, as needed.

The demodulated QPSK signal provides command and control information to the CPU 212 for generating certain graphics and control interface regions upon a television screen. The CPU is, for example, a Model 68302 processor manufactured by Motorola. This processor, operating in combination with the decoder 206 as well as a continuously available video signal from the information channel, produces screen displayed buttons, icons and graphical regions with which a subscriber interacts using the remote control. Without the video signal the set top terminal does not produce any display, i.e., the displays are actively generated in real time as needed to facilitate certain navigation functions.

Specifically, a joystick on the remote control 138 selectively highlights certain pre-defined regions of the television screen. To perform such highlighting, a reference region is always highlighted when a menu is first displayed. From that reference region, direction vectors produced by the joystick are interpreted by the CPU 212 to highlight a region lying in the direction in which the joystick was moved. When a desired selectable icon is highlighted, the subscriber depresses a "select" key on the remote that sends an infrared signal to an infrared receiver (a support circuit 216). This receiver sends the select command to the CPU for interpretation. The selected region is associated with a function. If the function is a request for specific information or a change in the menu, the processor formats the 212 command and sends it to the back channel transmitter 208 for transmission to the video session manager 122. If the command is a function that is handled locally, such as volume control, the CPU implements the function within the set top terminal 136.

Since the session control commands are implemented by the video session manager and not the set top terminal alone, the number of available session control commands is infinite. Each command is implemented by the execution of an applet, as described below. The applets control both information sessions, e.g., the presentation of video to the television screen, and navigator functions, e.g., the menus that facilitate selection of a video program. As such, particular commands include, but are not limited to, information or menu navigation commands, movie start at beginning, movie start at the middle, play, stop, rewind, forward, pause, and the like. These presentation and navigation control commands are sent via a back channel transmitter 208 using binary phase shift key (BPSK) modulation. Additionally, the CPU in the set top terminal implements certain local commands such as increment or decrement the volume, channel change, and on/off.

The invention is implemented as one or more interrelated "applets" which, when taken together, form the navigator of the present invention. The applets are transmitted, for the most part, to the set top terminal via the forward information channel. Certain information used by particular applets is transmitted to the set top terminal via a data stream propagated through the forward command channel. As such, the data stream carrying the applet is demodulated, the applet extracted and the applet's information decoded prior to execution that displays a menu on the display device. The detailed process by which an applet is downloaded and used to produce a menu is disclosed with respect to FIGS. 6 and 7 below.

Figure 3:
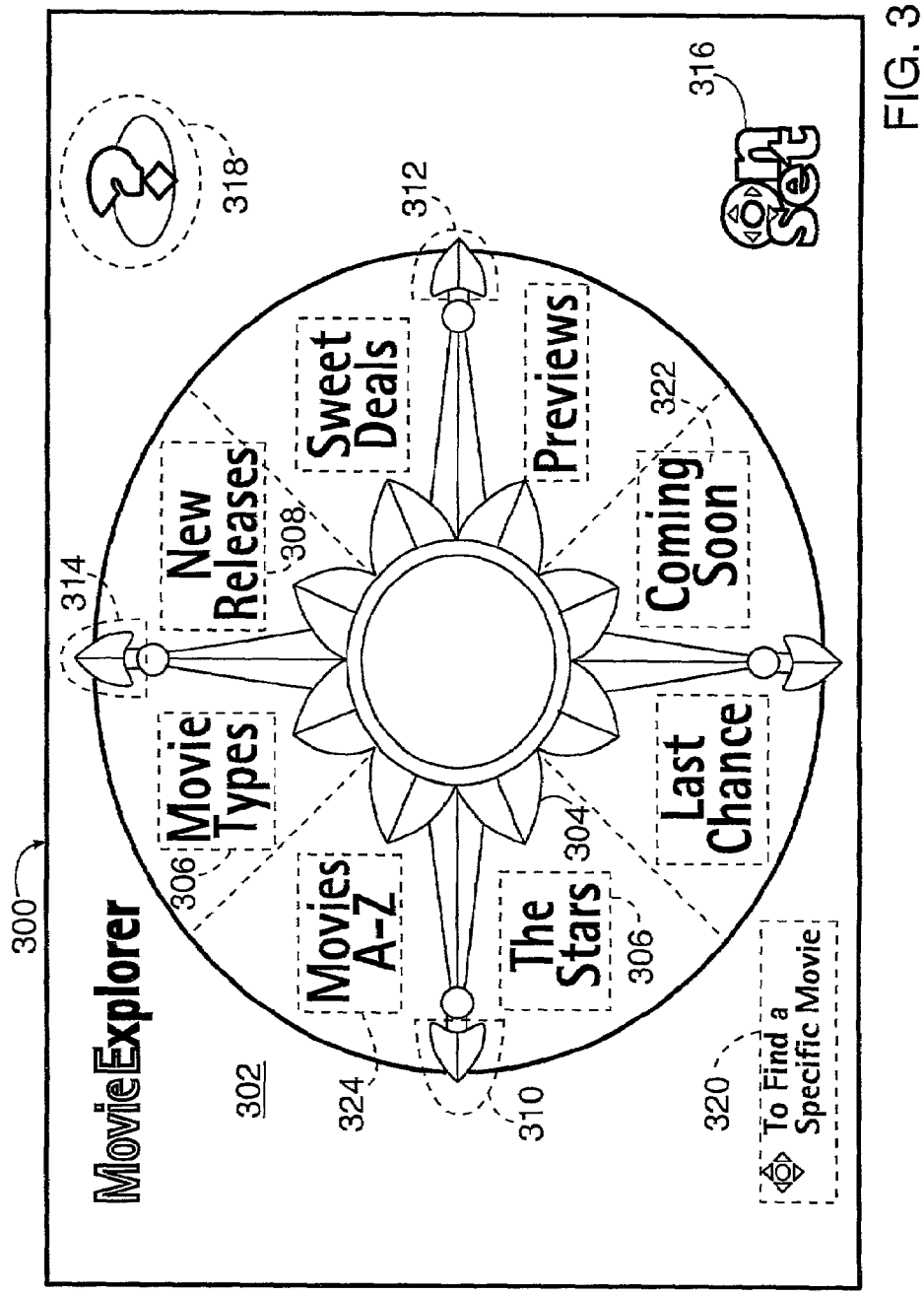
FIG. 3 depicts an illustrative "compass" menu display.
Figure 10:
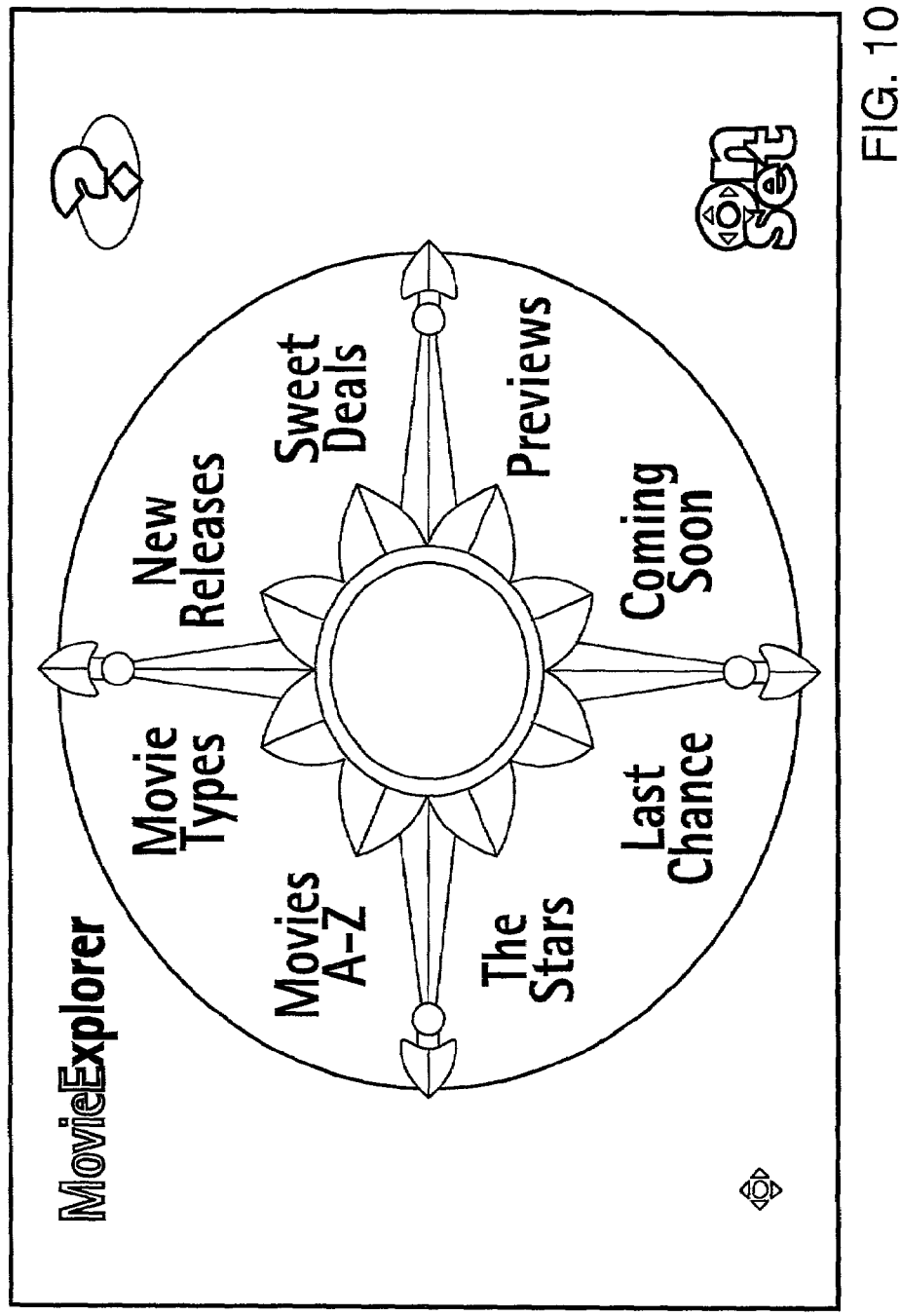
FIG. 10 depicts a "compass" menu.
Figure 11:
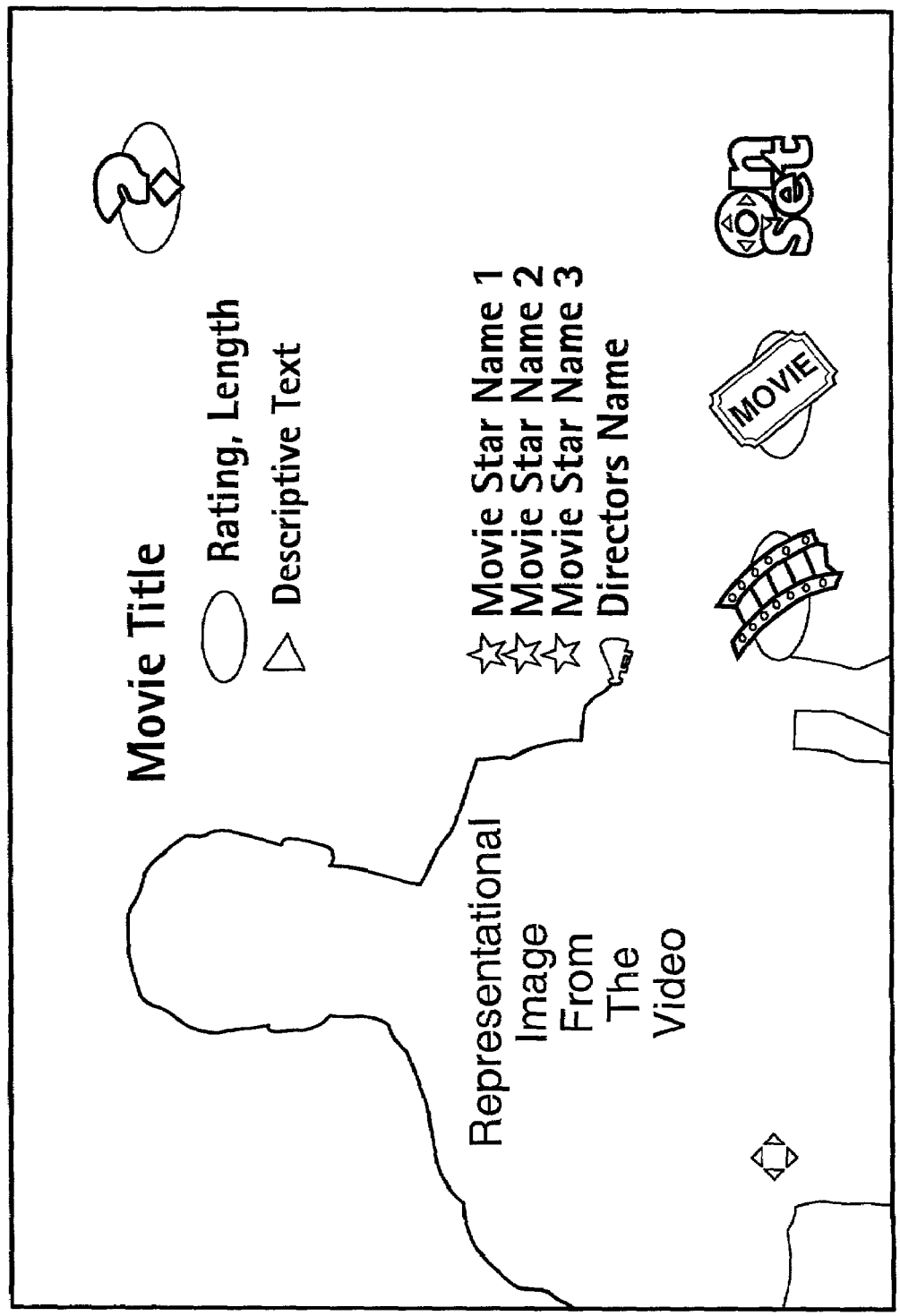
FIG. 11 depicts a movie information screen.
Figure 12:
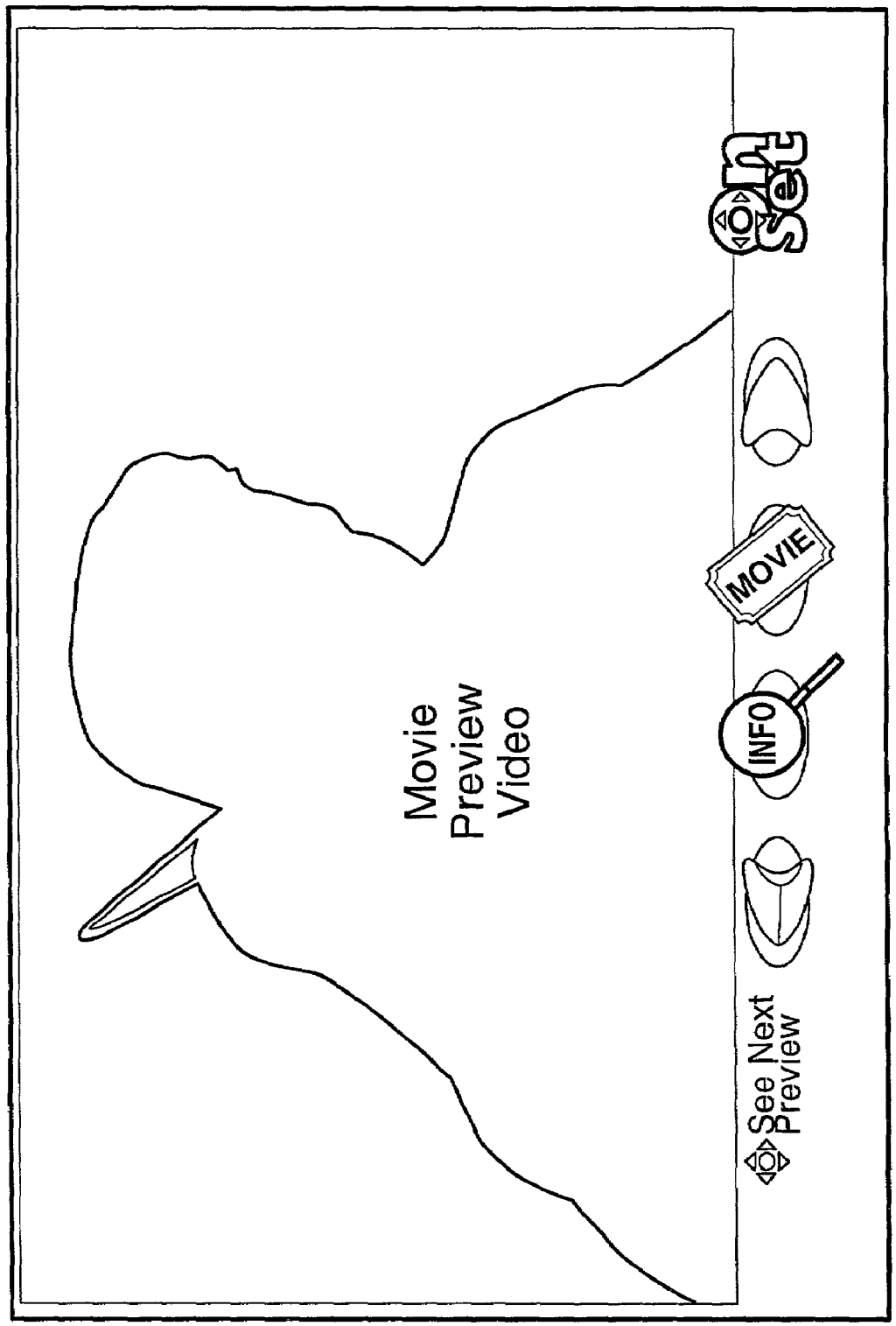
FIG. 12 depicts preview screen.
Figure 13:
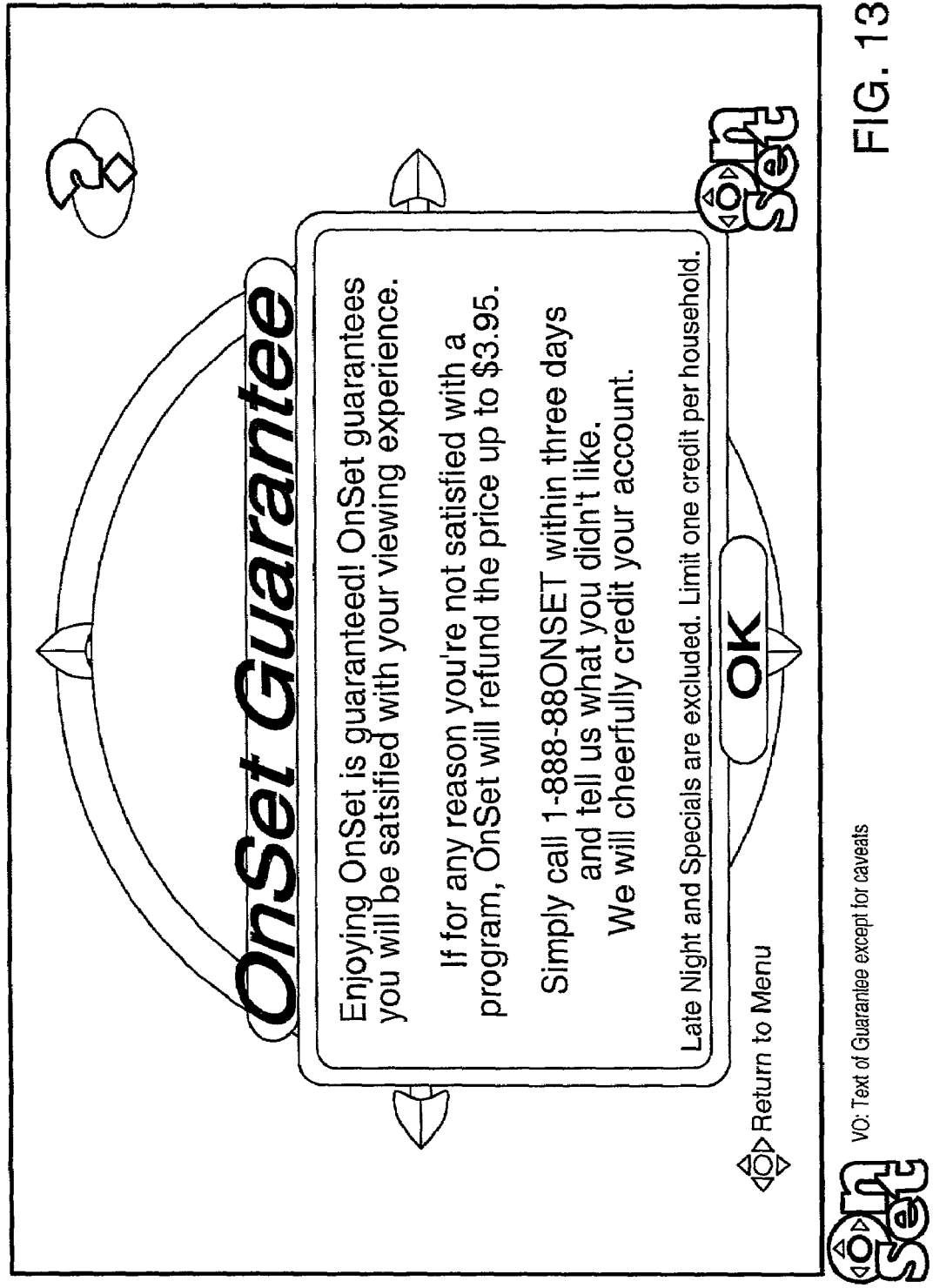
FIG. 13 depicts a guarantee screen.
Figure 14:
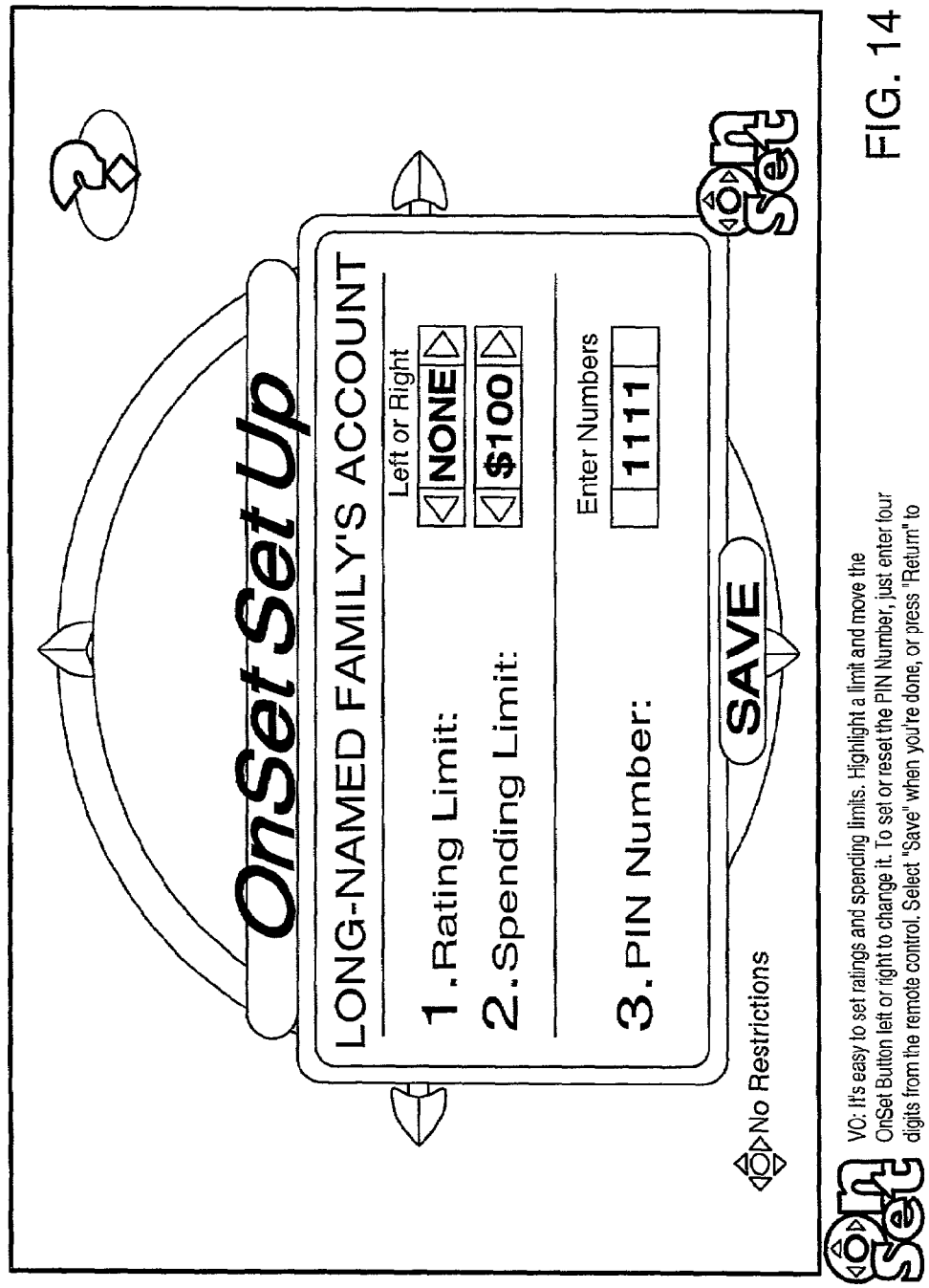
FIG. 14 depicts a set up screen.
Figure 15:
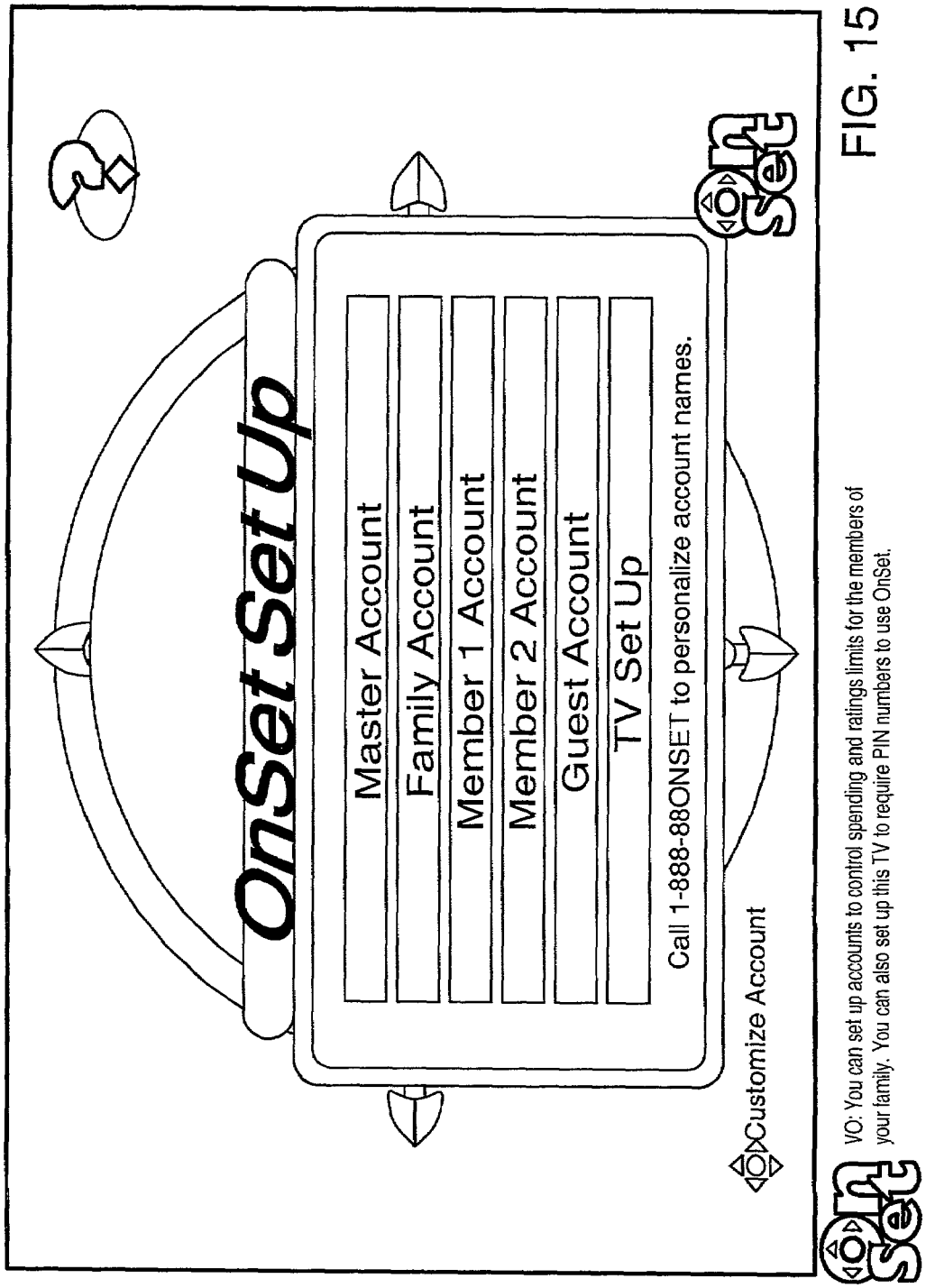
FIG. 15 depicts a set up menu.
Figure 16:
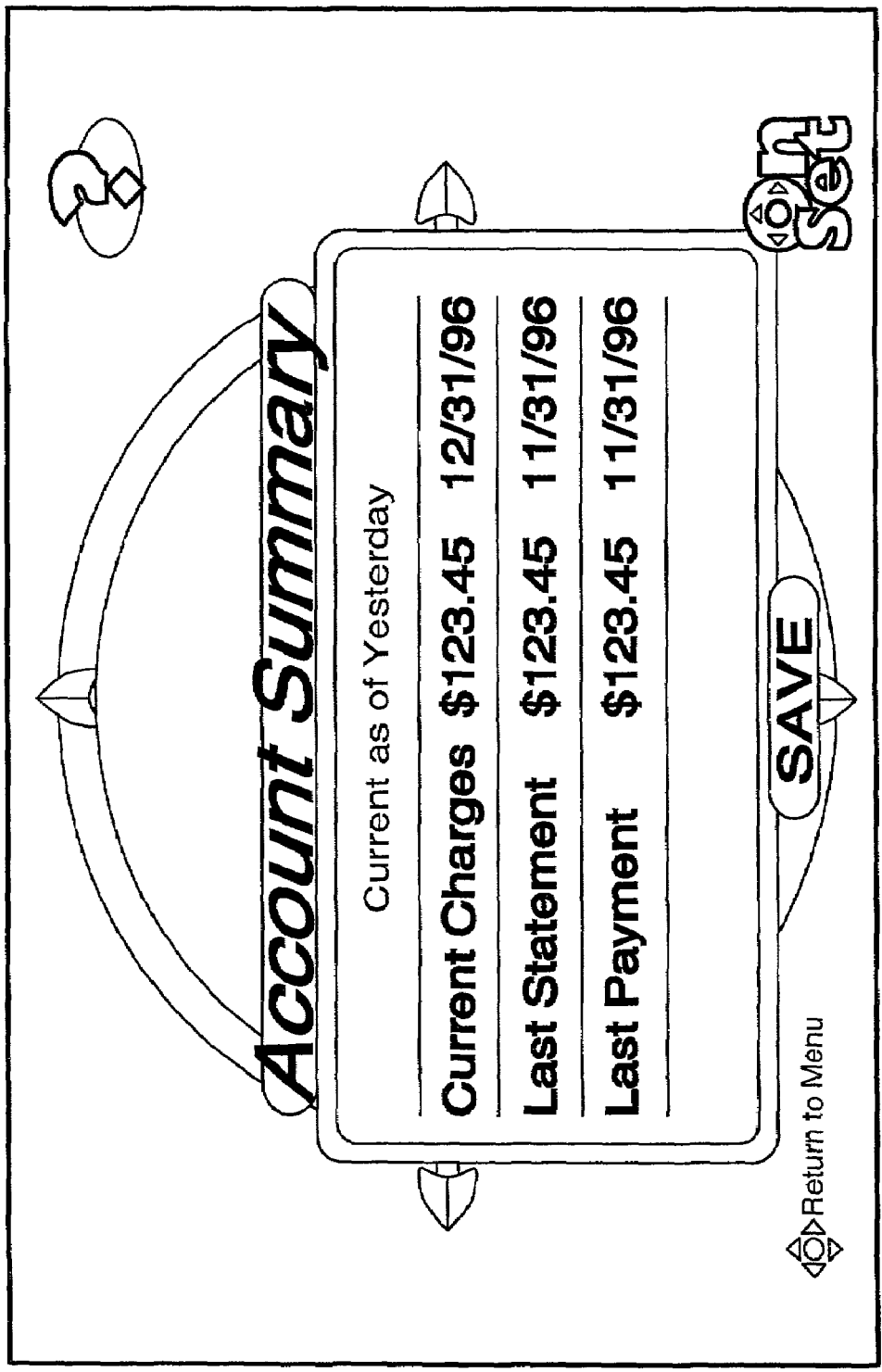
FIG. 16 depicts a account summary.
Figure 17:
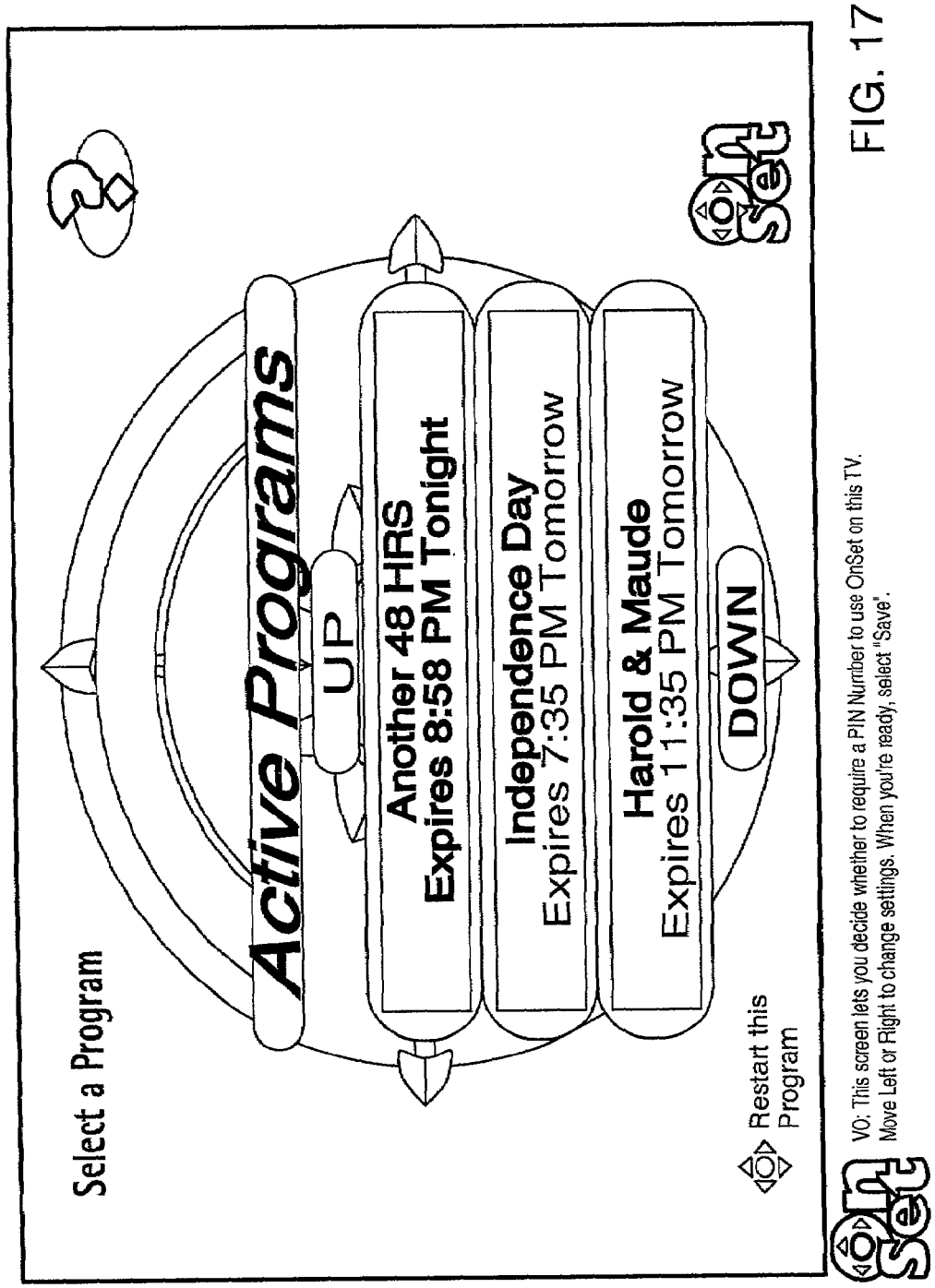
FIG. 17 depicts an active programs screen.
Figure 18:
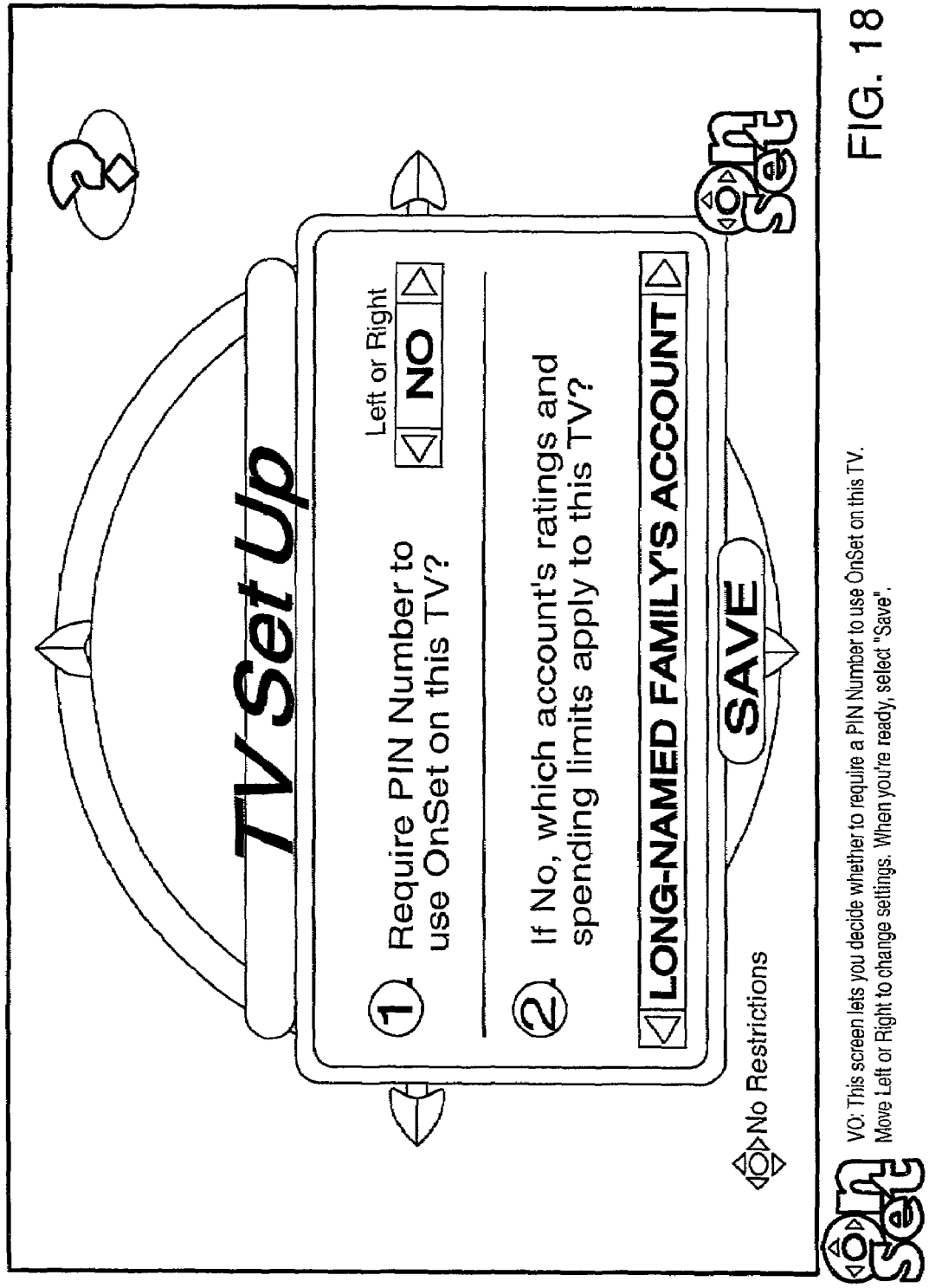
FIG. 18 depicts a TV set up menu.

FIGS. 3 and 10 depict illustrative menu imagery (a "compass" menu screen 300) used to select movies available from the information distribution system. All the information, as well as control instructions, to produce such a menu is contained in an applet downloaded from the service provider equipment. As such, the service provider equipment stores the applets in server memory such that each applet can be rapidly recalled and routed to a set top terminal for display.

The illustrated menu screen 300 contains background video 302 that contains the menu structure. The background video also produces the text and other fixed graphics, e.g., the compass 304. An overlay or foreground video of typically transparent on-screen display (OSD) bitmap graphics 306 (shown in phantom proximate each user selectable graphic or icon) is positioned atop the background video 302. Typically, one region of the foreground video is highlighted to identify the present selectable menu region or icon. As shall be described below, these OSD graphics are produced and controlled by the OSD graphics processor within the video decoder in the set top terminal.

The background video comprises a video layer, while the overlay or foreground video comprises a graphics layer. The generation of both the video layer and graphics layer is controlled by a control layer. Briefly, the video layer comprises displayed video images produced using, e.g., information contained in an applet. The graphics layer comprises OSD overlay(s) including graphical objects that are associated with applets stored in either subscriber or provider equipment. The OSD overlay(s) are displayed over the video layer. The control layer comprises a command processing and logical operations layer. The control layer retrieves the applets associated with graphic layer objects selected by a user, executes the applets, and provides video information to the video layer and object information to the graphics layer.

The applet may also carry audio information that would "play" when a particular event occurred or specific menu object selected. Additionally, an animation object could be carried in the applet to allow certain objects to become animated when selected.

Generally, when a user selects a particular icon, the graphic object in the overlay plane is altered to de-emphasize or emphasize the icon or the video underlying the graphic object. In other words, the object is altered from one state to another state to facilitate the emphasis/de-emphasis of a particular region of the menu.

In one embodiment of the invention, when a user selects a highlighted icon, the OSD graphic proximate that icon is immediately altered to acknowledge the selection. The alteration is typically a change of color of the transparent overlay such that the icon "glows". To effectuate this OSD alteration, each menu field represented by the region is defined by a pair of linked lists. One pair of linked lists in the menu is always active, i.e., there is always some region of the screen that is highlighted.

Alternatively, the OSD graphics may produce an opaque overlay that is made transparent (or partially transparent) when the region containing the overlay, or some other region, is selected. As such, the underlying video that lies beneath the overlay is revealed. Such a mask and reveal process enables the video to contain regions of imagery that are revealed upon selection, where these regions provide the user with recognizable and enjoyable information generally relating to the selection that was made or generally providing an enjoyable transition to the next screen. Furthermore, the mask and reveal process can be used to periodically mask and reveal certain imagery without the subscriber selecting any regions. This function may be used to merely provide a graphical enhancement to the display, i.e., emphasis and de-emphasis of particular menu regions.

The applet logic responds to the user commands entered through the remote control 138 by activating different linked lists (i.e., moving a starting link pointer), or by adding, removing, or changing the mix of regions in the active list. The applet logic also tells the CPU 212 which command sequence terminates the applet and which response to send to the video session manager 122. The applet logic contains a table of command sequences that are identified with specific coordinates defining the field locations on the menu.

The function of the navigator is generated through the use of Navigator descriptor files. These files are used as the basis for construction of all navigator applet screens. A navigator descriptor file defines specific objects (e.g., graphical bitmap, audio, animation and the like) to be used, their physical location on the navigator menu screen, and their interactions with the subscriber's remote control actions. The navigator asset builder software program uses the navigator descriptor files to generate the final pseudo MPEG bitstream that is sent to the set top terminal. The asset builder reads the objects as defined by the navigator asset builder and combines them with the appropriate control information also contained in the navigator descriptor files.

The navigator descriptor files are written in an HTML like language syntax specifically designed for this application. Each definition type starts with an angle bracket "<" immediately preceding the definition name. The definition type ends with an angle bracket, a forward slash "</" and then the definition name. Definitions can be nested. The navigator description file for building an applet having bitmap objects includes the following type definitions:

REGION: Lists all of the bitmaps that reside within an individual region on the screen, their specific locations within the region, and palette specific information for each bitmap.

PALETTE: Defines a palette of one or more colors.

BUTTON: Defines a control that appears as one or more previously defined bitmaps on the subscriber's television and can cause actions to take place (primarily messages sent upstream) when the subscriber presses the SELECT button on the remote control while the button is highlighted.

LIST: Defines a control that consists of one or more bitmaps (usually a rectangular region of constant color) that is overwritten with TEXT sent from the upstream process and rasterized onto the region. Generally the text remains visible and the background colors change per subscriber selection.

STATIC: Defines a control that consists of one bitmap (usually a rectangular region of constant color) into which upstream text is rastorize and made visible no matter what the subscriber selects with the remote control.

EDIT: Defines a control that consists of one bitmap (usually a rectangular region of constant color) into which user entered text (as in numbers from the remote control are rasterized. The text generally remains visible for that entire applet. The background color changes as the subscriber selects or unselects the edit region. Edit controls also can exhibit the behavior that require a predefined number of characters to be entered by the subscriber through the remote control before any other buttons or controls can be actuated.

ACTION: Messages that are formatted and sent upstream via the back channel when the subscriber presses the SELECT button while the corresponding ACTION control is highlighted.

Figure 7:
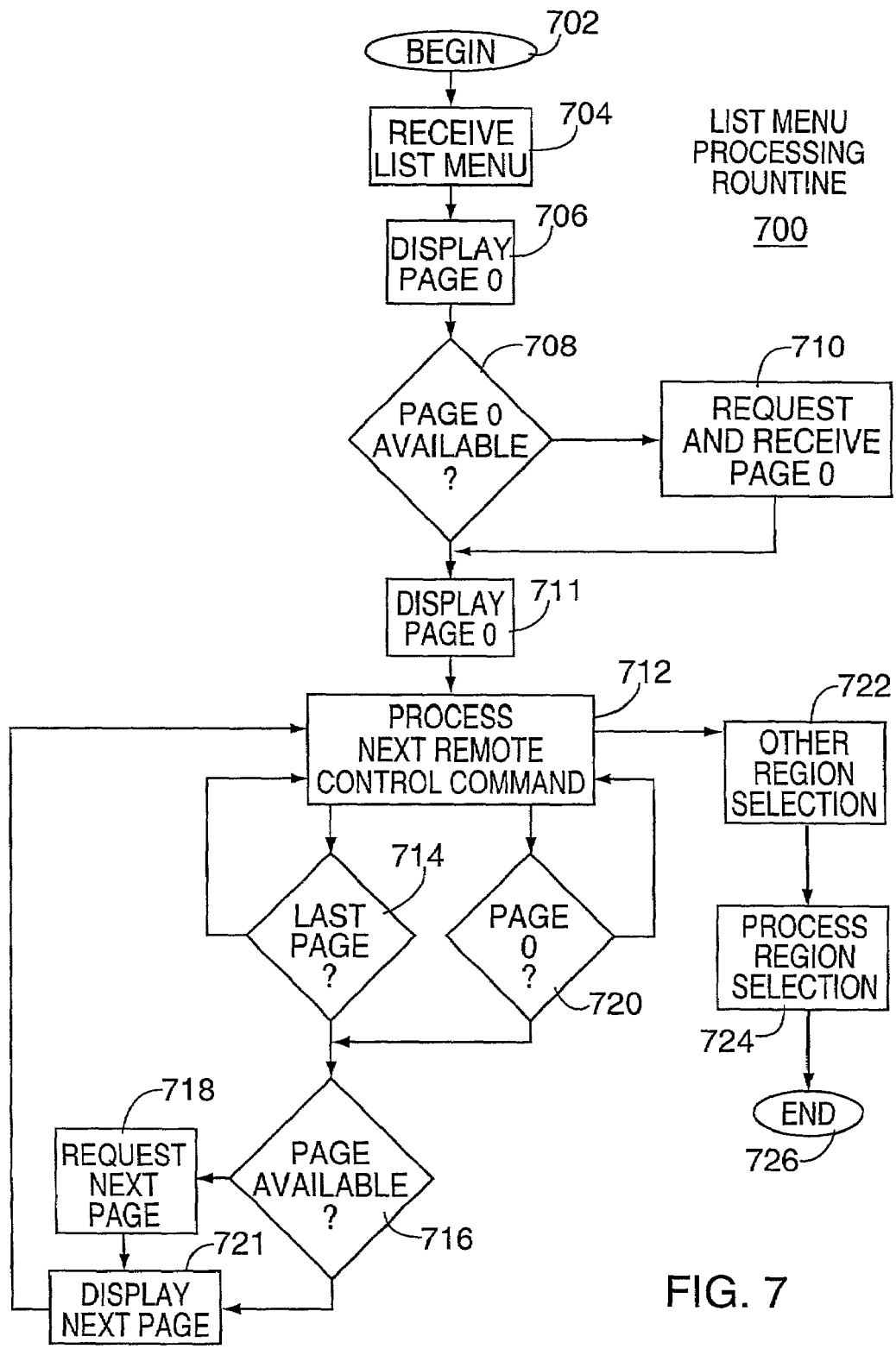
FIG. 7 depicts a flow diagram of list information processing routine.
Figure 19:
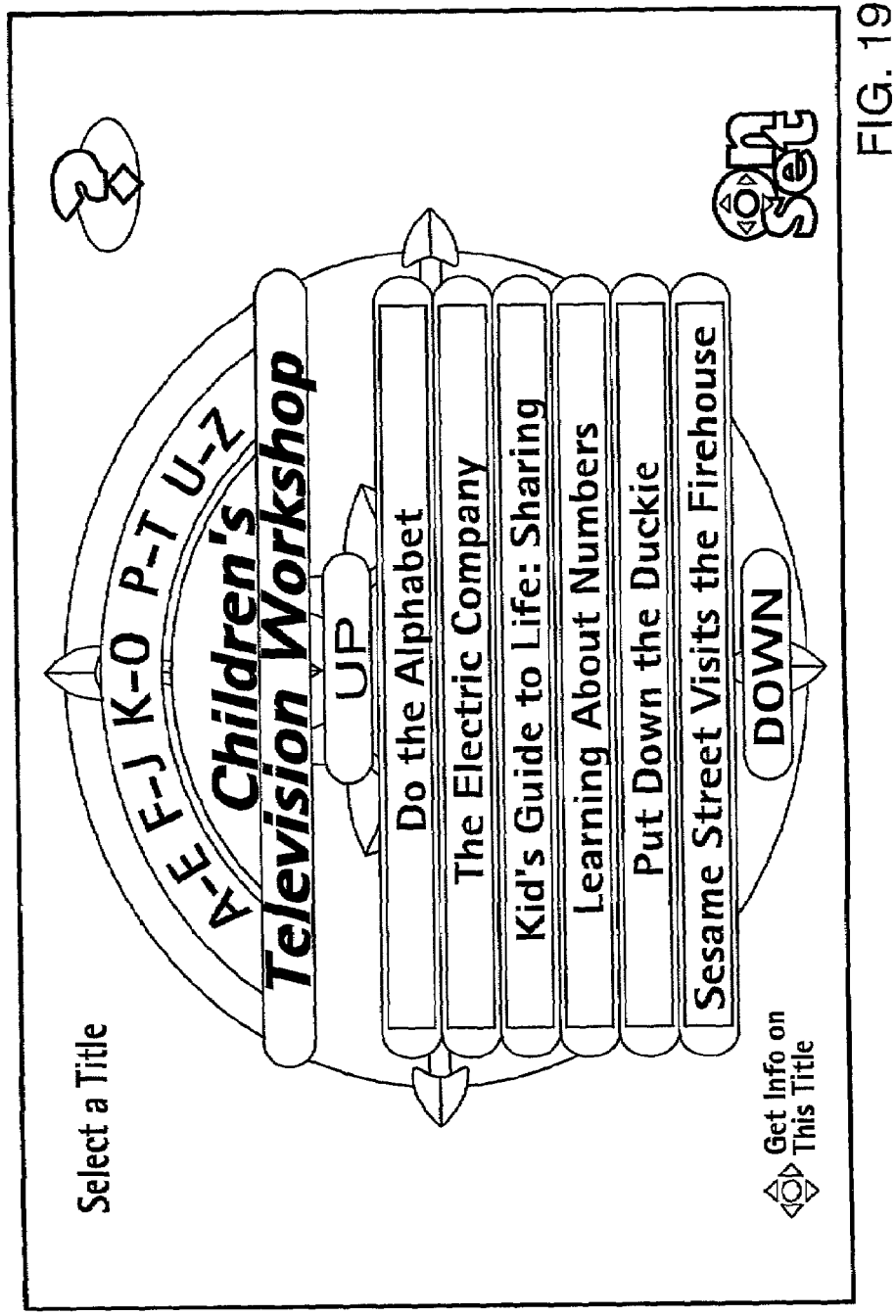
FIG. 19 depicts a list menu.

For example, a Navigator Descriptor File for a List Screen (LAZ) such as that which appears in FIG. 19 and whose operation is discussed with respect to FIG. 7 is structured as follows:

<SCREEN name=LAZ>

```
#### Define Regions ##########
<REGION MIX=3>
    <BMP NAME=UpLevelInfo FILE=/ms/bmp/up_mme¯2 X=88
    Y=398 BG=0>
</REGION>
    <BMP NAME=UpInfo FILE=/ms/bmp/listup¯2 X=88
    Y=398 BG=0>
</REGION>
<REGION MIX =3>
    <BMP NAME=Chop FILE=/dv/chopstr X=555 Y=394
    BG=14>
    <BMP NAME=ChopInfo FILE=/ms/bmp/chop_m¯2 X=88
    Y=398 BG=0>
</REGION>
</REGION MIX=2>
    <BMP NAME=Up FILE=/ms/bmp/list¯1 X=287 Y=166
    BG=0>
    <BMP NAME=line1 FILE=dv/line X=163 Y=205 BG=1>
    <BMP NAME=line2 FILE=/dv/line X=163 Y=236 BG=1>
    <BMP NAME=line3 FILE=/dv/line X=163 Y=267 BG=1>
</REGION>
</REGION MIX=2>
    <BMP NAME=line4 FILE=/dv/line X=163 Y=298 BG=1>
</REGION>
</REGION MIX=2>
    <BMP NAME=line5 FILE=/dv/line X=163 Y=329 BG=1>
    <BMP NAME=line6 FILE=/dv/line X=163 Y=360 BG=1>
    <BMP NAME=ChopTop FILE=/dv/chopsttp X=555 Y=355
    BG=14>
```

-continued

```
</REGION>
<REGION>
    <BMP NAME=AEInfor FILE=/ms/bmp/list_a¯1 X=88
    Y=392 BG=0>
</REGION>
<REGION>
    <BMP NAME=FJInfo FILE=/ms/bmp/list_f¯1 X=88
    Y=392 BG=0>
</REGION>
<REGION>
    <BMP NAME=KOInfo FILE=/ms/bmp/list_k¯1 X=88
    Y=392 BG=0>
</REGION>
<REGION>
    <BMP NAME=PTInfo FILE=/ms/bmp/list_p¯1 X=88
    Y=392 BG=0>
</REGION>
<REGION>
    <BMP NAME=UZInfo FILE=/ms/bmp/list_u¯2 X=88
    Y=392 BG=0>
</REGION>
<REGION>
    <BMP NAME=Down FILE=/ms/bmp/list_d¯12 X=286
    Y=388 BG=0>
    <BMP NAME=DownInfo FILE=/ms/bmp/list_d¯2 X=88
    Y=392 BG=0>
</REGION>
</REGION MIX=6>
    <BMP NAME=SAUSAGE FILE=/dv/sausage BG=14 X=178
    Y=53>
    <BMP NAME=AE FILE=/dv/ae BG=14 X=178 Y=53>
    <BMP NAME=FJ FILE=/dv/fj BG=14 X=178 Y=53>
    <BMP NAME=KO FILE=/dv/ko BG=14 X=178 Y=53>
    <BMP NAME=PT FILE=/dv/pt BG=14 X=178 Y=53>
    <BMP NAME=UZ FILE=/dv/uz BG=14 X=178 Y=53>
</REGION>
</REGION MIX=3>
    <BMP NAME=Help FILE=/ms/bmp helpst¯1 X=555 Y=8
    BG=2>
</REGION>
<REGION>
    <BMP NAME=HelpInfo FILE=/ms/bmp/help_9¯1 X=88
    Y=392 BG=0>
</REGION>
<REGION>
    <BMP NAME=ListInfo FILE=/ms/bmp/list_t¯1 X=88
    Y=398 BG=0>
</REGION>
<REGION>
    <BMP NAME=UpLevel FILE=/ms/bmp/up_mme¯1 X=274
    Y=24 BG=0>
        ########## Define Special Palettes ##########
<PALETTE NAME=off>
    <RGB 0 150 150 TRANSPARENT>
    <RGB 0 0 0>
</PALETTE>
<PALETTE NAME=active>
    <RGB 0 255 179>
    <RGB 0 0 0>
</PALETTE>
</PALETTE NAME=BON>
    <RGB 255 255 255 TRANSPARENT>
</PALETTE>
<PALETTE name=HighLite>
    <RGB 0 255 179>
    <RGB 0 0 0>
</PALETTE>
        ########## Define Controls ##########
<LISTBOX NAME=listbox ON=active OFF=off SEL-LISTSEL
FONT=0>
    <GOTO N=Up S=Down>
    <GOTO E=Chop>
    <TAB TYPE=CENTER STOP=188>
    <TAB TYPE=LEFT STOP=188>
    <ENTRY ASC=line1>
    <ENTRY ASC=line2>
    <ENTRY ASC=line3>
    <ENTRY ASC=line4>
    <ENTRY ASC=line5>
```

```
        <ENTRY ASC=line6>
        <FOCUS ASC=ListInfo ON=ListInfo>
        <ACTION MSG=SELECT>
            <FADE>
            <SENDSTRINGS LISTSEL>
        </ACTION>
</LISTBOX>
<BUTTON NAME=DOWN>
    <FOCUS ASC=Down ON=Down>
    <FOCUS ASC=DownInfo ON=DownInfo>
    <GOTO N=listbox E=Chop>
    <ACTION MSG=SELECT>
        <PGDOWN LIST=listbox>
    </ACTION>
</BUTTON>
<BUTTON NAME=Up>
    <FOCUS ASC=Up ON=Up>
    <BMP NAME=DownInfo FILE=/ms/bmp/list_d[]2 Xz88
    <FOCUS ASC=UpInfo ON=UpInfo>
    <GOTO S=listbox N=KO>
    <ACTION MSG=SELECT>
        <PGUP LIST=listbox>
    </ACTION>
</BUTTON>
<BUTTON NAME=UpLevel>
    <FOCUS ASC=UpLevel ON=UpLevel>
    <FOCUS ASC=UpLevelInfo ON=UpLevelInfo>
    <GOTO S=KO E=Help>
    <ACTION MSG=SELECT>
        <FADE>
        <TRANSITION DIR=U>
    </ACTION>
</BUTTON>
</BUTTON NAME=AE>
    <FOCUS ASC=SAUSAGE ON=BON>
    <FOCUS ASC=AE ON=HighLite>
    <FOCUS ASC=AEInfo ON=AEInfo>
    <GOTO S=Up E=FJ N=UpLevel>
    <ACTION MSG=SELECT>
        <SENDSTRINGS AE>
    </ACTION>
</BUTTON>
<BUTTON NAME=FJ>
    <FOCUS ASC=SAUSAGE ON=BON>
    <FOCUS ASC=FJ ON=HighLite>
    <FOCUS ASC=FJInfo ON=FJInfo>
    <GOTO S=Up E=KO W=AE N=UpLevel>
    <ACTION MSG=SELECT>
        <SENDSTRINGS FJ>
    </ACTION>
</BUTTON>
<BUTTON NAME=KO>
    <FOCUS ASC=SAUSAGE ON=BON>
    <FOCUS ASC=KO ON=HighLite>
    <FOCUS ASC=KOInfo ON=KOInfo>
    <GOTO S=Up E=PT W=FJ N=UpLevel>
    <ACTION MSG=SELECT>
        <SENDSTRINGS KO>
    </ACTION>
</BUTTON>
<BUTTON NAME=PT>
    <FOCUS ASC=SAUSAGE ON=BON>
    <FOCUS ASC=PT ON=HighLite>
    <FOCUS ASC=PTInfo ON=PTInfo>
    <GOTO S=Up E=UZ W=KO N=UpLevel>
    <ACTION MSG=SELECT>
        <SENDSTRINGS PT>
    </ACTION>
</BUTTON>
<BUTTON NAME=UZ>
    <FOCUS ASC=SAUSAGE ON=BON>
    <FOCUS ASC=UZ ON=HighLite>
    <FOCUS ASC=UZInfo ON=UZInfo>
    <GOTO S=Up W=PT E=Help N=UpLevel>
    <ACTION MSG=SELECT>
        <SENDSTRINGS UZ>
    </ACTION>
</BUTTON>
<BUTTON NAME=Help>
    <FOCUS ASC=Help ON=Help>
    <FOCUS ASC=HelpInfo ON=HelpInfo>
    <GOTO W=UZ>
    <GOTO S=Chop>
    <ACTION MSG=SELECT>
        <FADE>
        <TRANSITION DST=HLS DIR=D>
    </ACTION>
</BUTTON>
<BUTTON NAME=Chop>
    <FOCUS Chop ASC=Chop ON=Chop>
    <FOCUS ChopInfo ASC=ChopInfo ON=ChopInfo>
    <FOCUS ChopTop ASC=ChopTop ON=ChopTop>
    <GOTO W=Down>
    <GOTO N=Help>
    <ACTION MSG=SELECT>
        <FADE>
        <TRANSITION DST=MME DIR=J>
    </ACTION>
</BUTTON>
</SCREEN>
```

Figure 8:
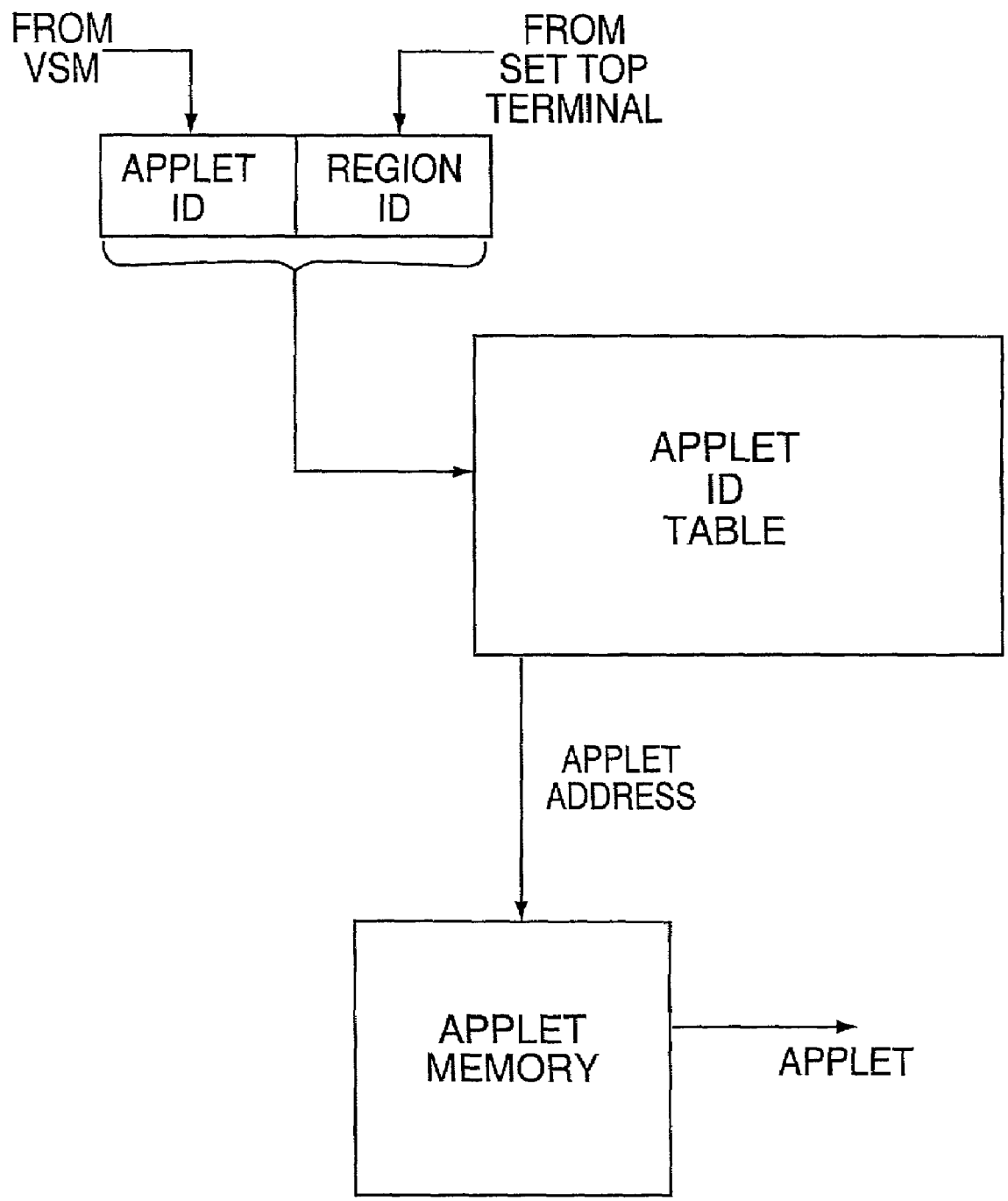
FIG. 8 depicts a flow process for retrieving and transmitting an applet.
Figure 9:
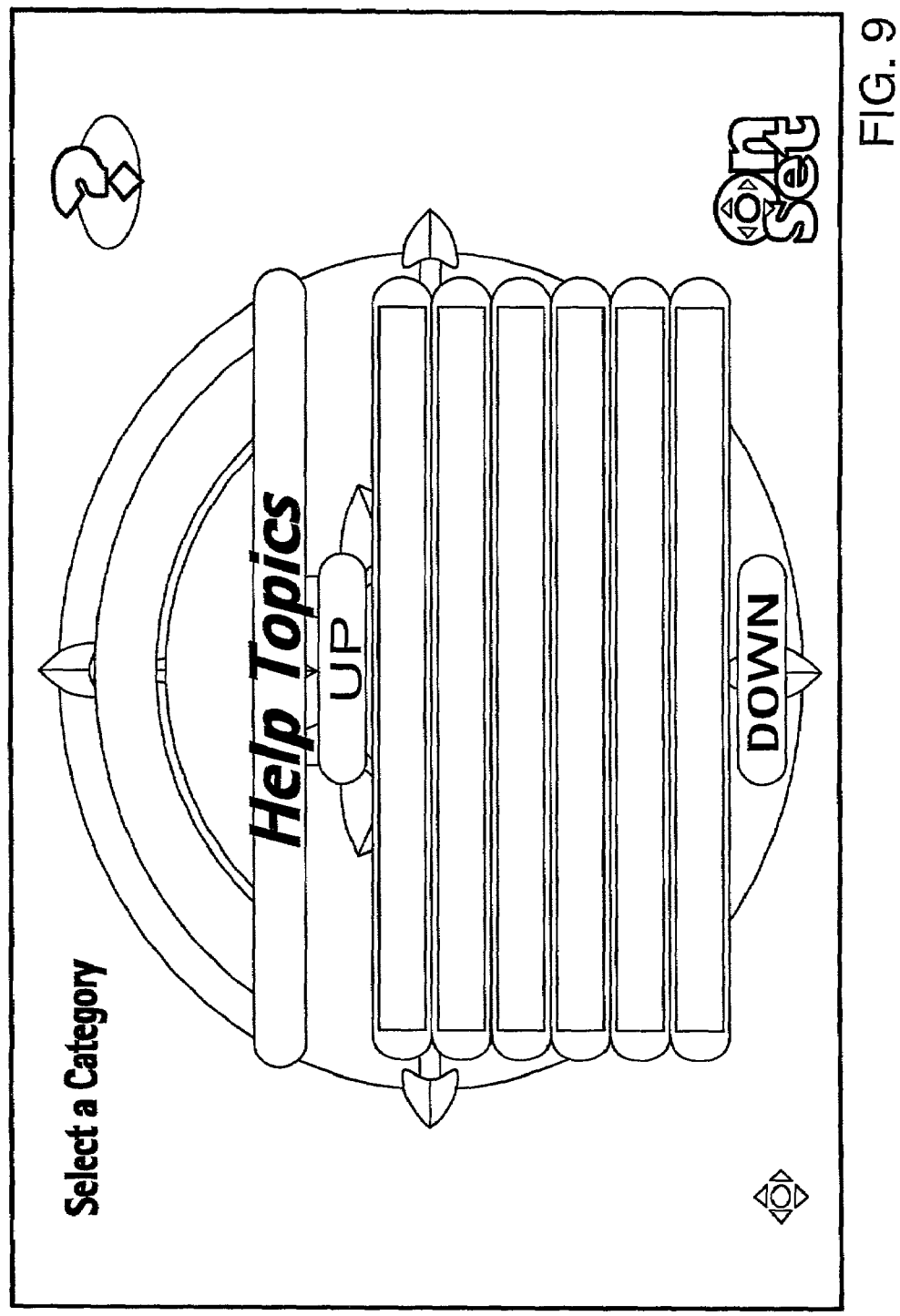
FIG. 9 depicts a help menu.

As shown in FIG. 8, an address (region ID) identifying the selected region is transmitted to the video session manager. The video session manager concatenates the region address with an address of the applet within which the region selection was made. The concatenated address is used to identify an entry (an applet ID) in an applet table. This applet ID indicates the applet that is to be sent to fulfill the subscriber's request. The AID may also identify a movie or other multimedia information that is to be transmitted. The specific applet routine identified by the applet ID is recalled from memory and forwarded to the set top terminal for execution. The set top terminal then performs a function identified by the applet, e.g., decode the signals with assets (applet decoding), decode signals without assets (decode applet without any controls except return), decode movie from beginning, or decode movie from middle. As such, the set top terminal does not perform any high level functions, the terminal, in most instances, merely functions as a video decoder and command interpreter.

Figure 4:
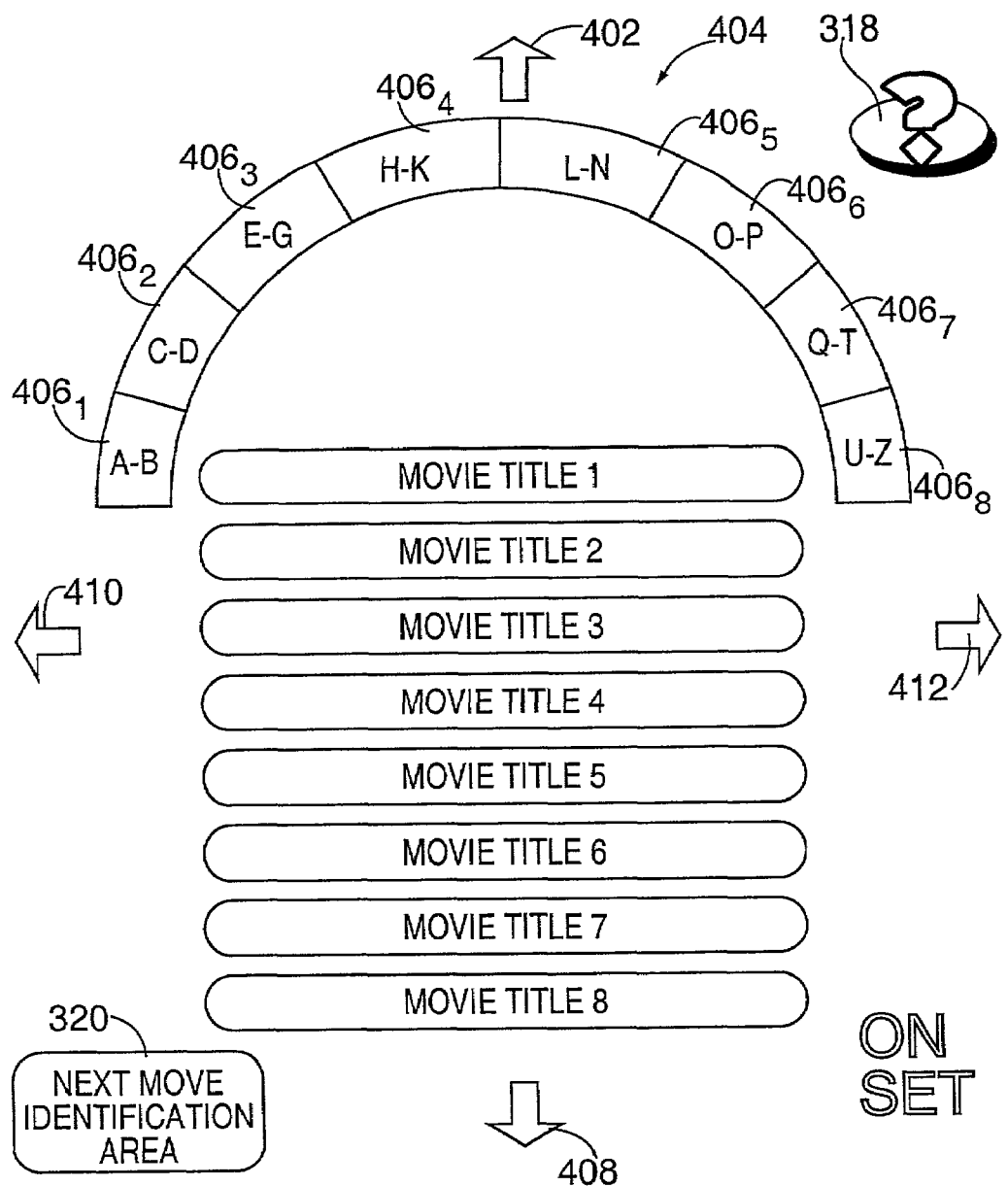
FIG. 4 depicts a second illustrative "list" menu display containing a text list of selections.

Returning to FIGS. 3 and 10, each menu is linked to other menus as a linked list such that selection of a particular icon results in another applet being downloaded and another menu being generated. In addition to textual icons, the menu 300 contains a "compass" 304. This compass forms a "spatial mnemonic" through which a subscriber navigates through the various menu screens. For example, the east and west arrows (310 and 312) link to menus that are conceptually lateral to the present menu. Such menus that are lateral to, for example, the movie explorer menu 300 are new movie promotional clips and a special interest list menu. The north arrow 314 links to a previous menu. The south arrow is generally non-functional in the particular menu shown. Other icons on the menu 300 include a help icon 318 and a current highlighted region description area 320. As such, area 320 provides a short description of the presently highlighted region, e.g., the explanation of "Movies A–Z" is shown. Selecting region 324 executes an applet that produces a "list menu", as described with respect to FIGS. 4 and 19 below. Other icons link to short multimedia "clips". For example, the "Coming Soon" icon 322 links to a series of promotional clips or graphics that advertise movies that will soon be available. The "On Set" icon 316, when selected, leads back to the initial menu into the navigator or some other high level point in the navigator tree. The "On Set"

icon appears on every menu to provide an direct link to a higher level of the navigator from any menu.

For example, selecting the "Movies A–Z" textual icon 324 links to an alphabetical menu (see menu 400 of FIGS. 4 and 19) that presents an alphabetical list 402 of all the available movies. The arcuate menu region 404 contains a plurality of alphabetic ranged segments 406$_n$ (where n is an integer value) that, when selected, presents a menu list containing the movie titles in the selected alphabetic range. The subscriber can then scroll through the alphabetical list 402 using the up arrow icon 402 to move to a previous page of movies and the down arrow 408 to move to a following page. Manipulating the joystick will sequentially highlight the movie titles until a desired title is highlighted. Selecting a name of a movie causes that movie to be sent to the set top terminal for presentation. The left and right arrows 410 and 412 move to similar lists in parallel menus, e.g., moving from an alphabetical list of comedies may move to an alphabetical list of dramas and so on. When an arrow (or any icon) is highlighted, a move identifier area 320 presents a short description of the menu that will be presented if that icon is selected.

Prior to completing a transaction for purchase of a movie or other service, other applets are downloaded to the set top terminal which form menus stating the price of the selection, confirming the selection, showing a preview prior to purchase, and the like.

An illustrative set of particular menus used by the system are shown in FIGS. 9–19. These menus include: a help menu (FIG. 9) containing a list of help topics; a compass menu (FIG. 10) as discussed above; a movie information screen (MIS) (FIG. 11) containing a movie abstract as well as a preview button, buy button, "on set" button and help button; a movie preview screen (FIG. 12) containing a region for a video preview to be played, arrow buttons to next/previous preview, buy button, information (MIS) button and on set button; guarantee screen (FIG. 13); set up menu (FIG. 14) containing fields for entering a rating limit, a spending limit and a PIN as well as a save button and an on set button; a list menu (FIG. 15) illustrating set up information; an account summary screen (FIG. 16); an session summary menu (FIG. 17) containing the active programs associated with present PIN; a TV set up menu (FIG. 18); an alphabetical listing menu (FIG. 19) as previously described. At the bottom of each of the screens depicted in FIGS. 13–18 is printed an example of the audio voice over (VO) that is reproduced as each screen is displayed.

Figure 5:
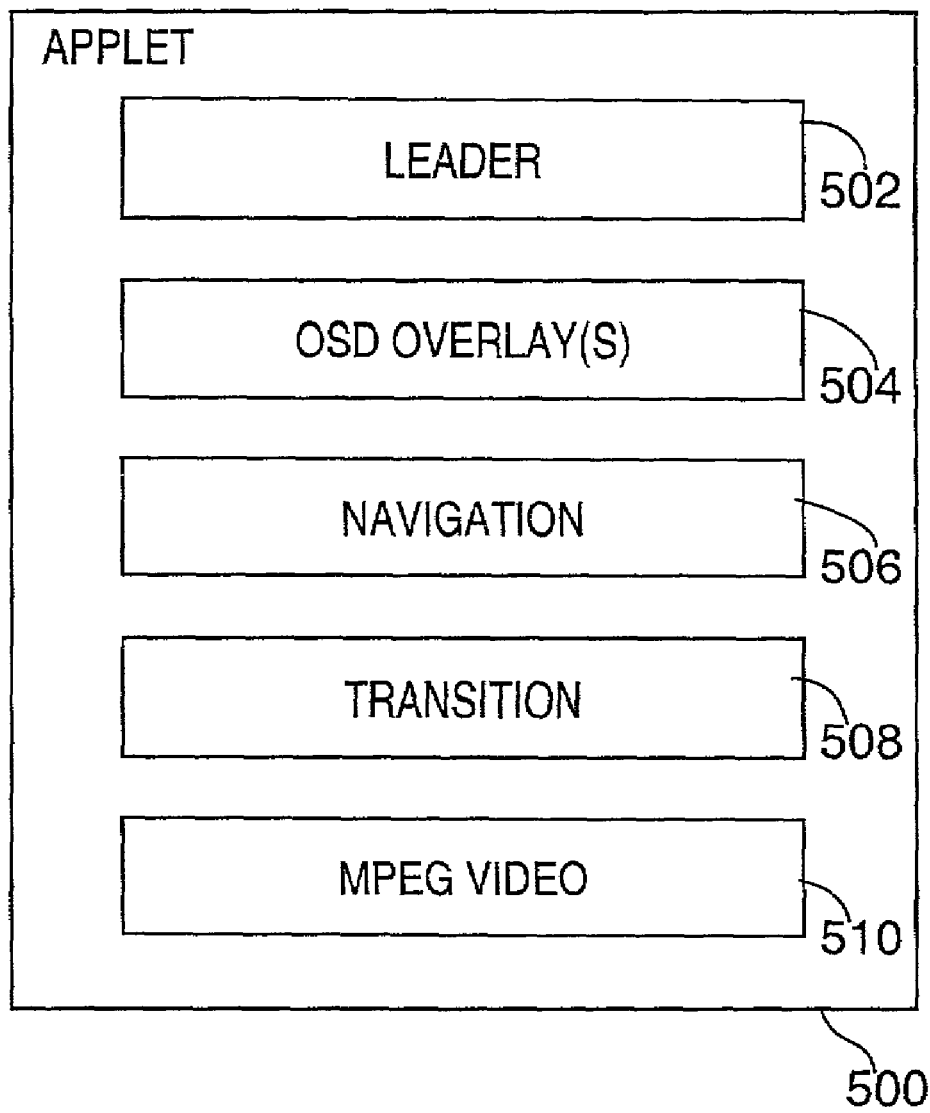
FIG. 5 depicts a schematic illustration of the content of an applet.

FIG. 5 depicts a schematic diagram of the contents of the portion of an applet 500 that is transmitted via the information channel to implement each of the menus. Separately, the descriptor file is transmitted via the command channel (or alternatively the information channel) such that the functions of the applet can be implemented. A descriptor file for each menu may be transmitted and stored (or prestored) in the set top terminal. Specifically, the applet 500 contains a leader 502, OSD overlay graphics 504, navigator control instructions 506, transition signal 508, and compressed (e.g., MPEG) background video 510. As such, upon selection of an icon in a given menu, an applet for the linked menu is transmitted from server to the set top terminal. That applet carries the background video and the OSD overlays as well as all instructions necessary to implement the functions of the menu. The video session manager maintains the linked list (menu tree) of applet interrelations such that when the set top terminal sends a command via the back channel, the video session manager interprets the command and causes the server to send the appropriate applet. The applet begins with the leader 502 which is followed by the OSD overlays 502 which are decoded by the OSD decoder while the remainder of the applet is being processed. The navigation control instructions 504 facilitate overlay activation and transition control. The transition signal is generally a packet that identifies the end of the navigator information and the beginning of the new MPEG video. Lastly, the new MPEG video signal is sent and presented in combination with the OSD graphics. At some point in the menu structure, the subscriber selects a movie title and the video session manager causes the server to send the selected movie.

Figures 6, 6A:
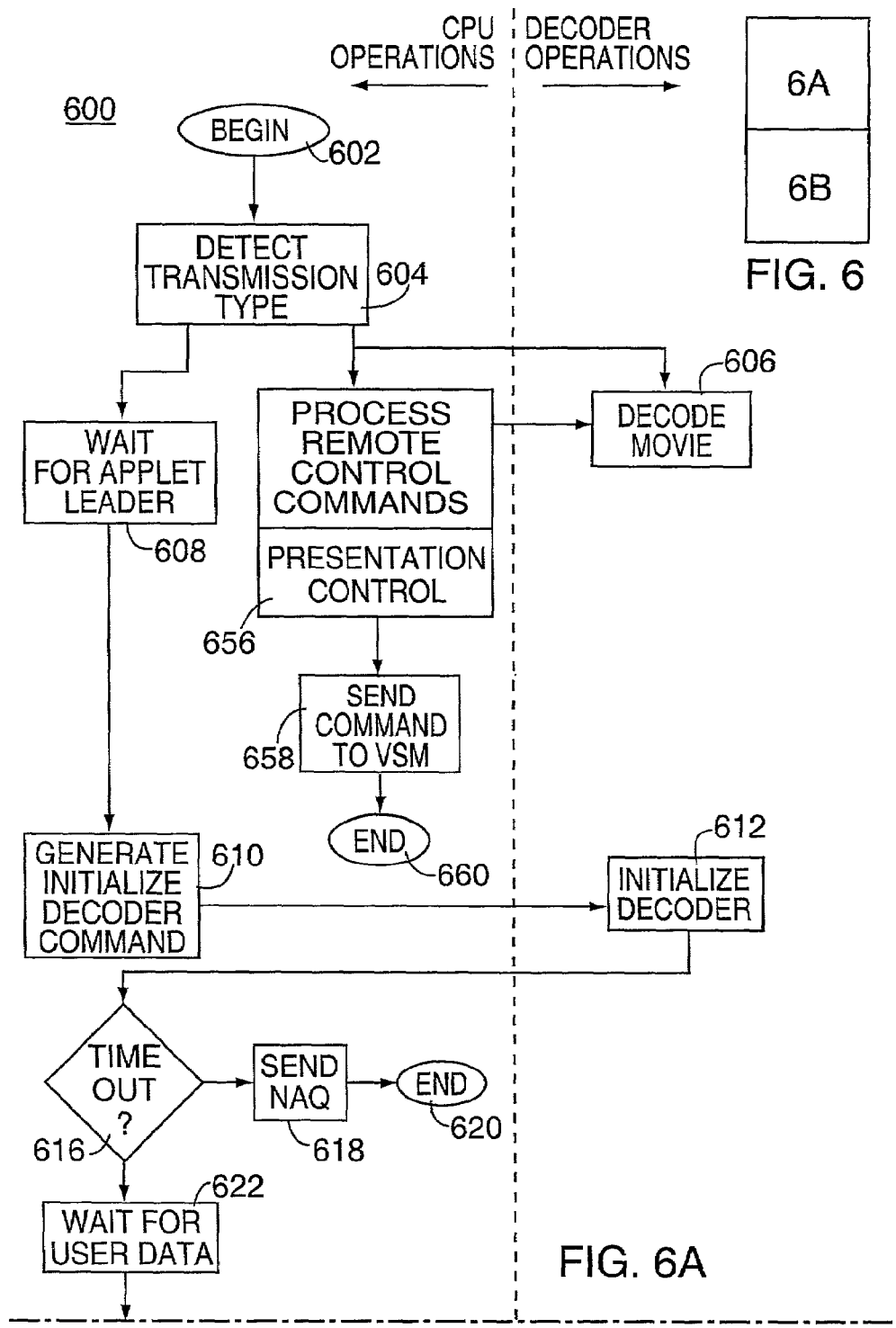
FIG. 6 depicts the appropriate alignment of FIGS. 6A and 6B.
FIGS. 6A and 6B, taken together, depict a flow diagram of an applet transmission and execution routine.
Figure 6B:
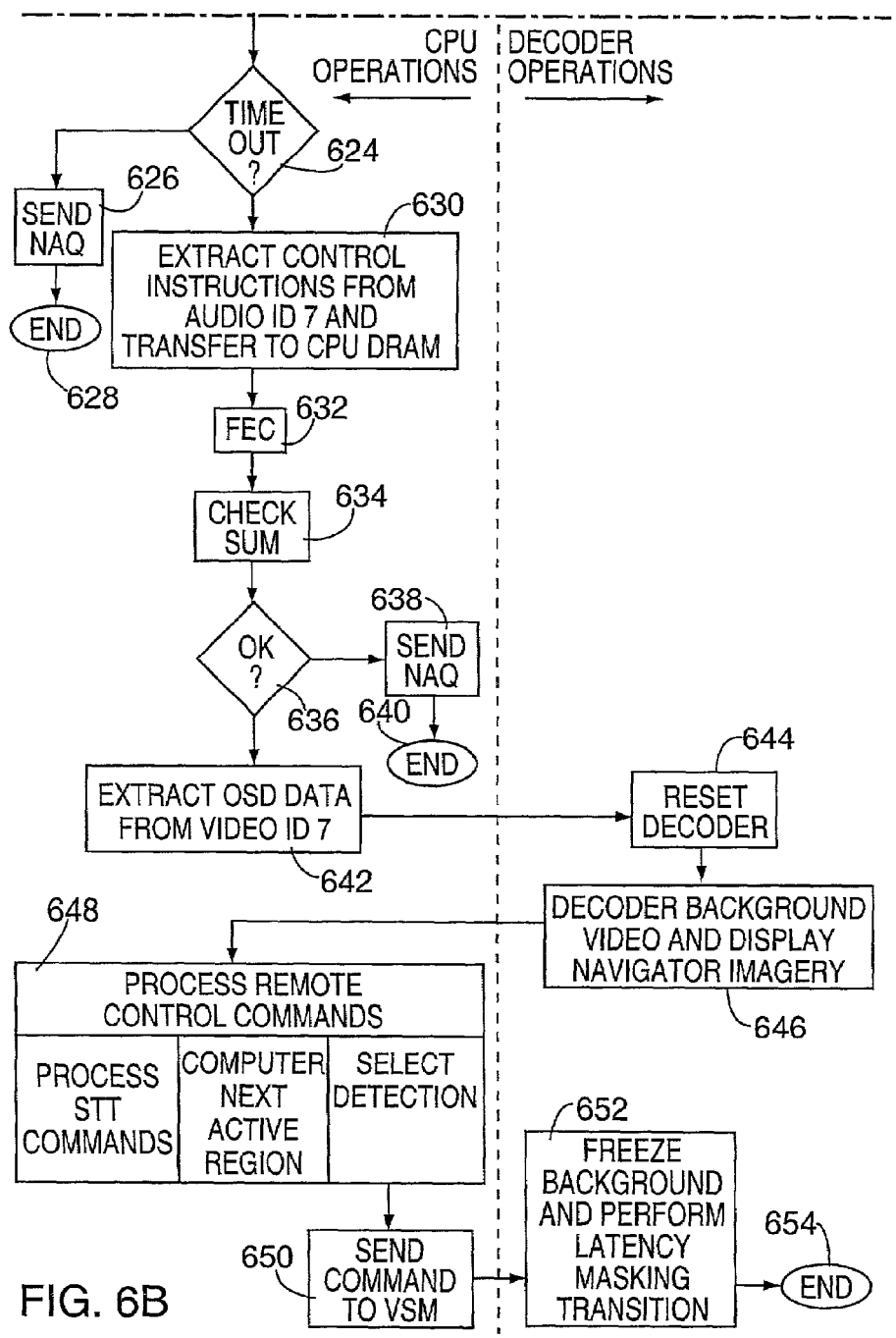

FIG. 6 depicts the appropriate alignment of FIGS. 6A and 6B. These figures, taken together, depict an applet transmission and execution routine 600. The diagram depicts the portion of the routine handled by the CPU on the left and the portion of the routine handled by the OSD decoder on the right. The CPU primarily handles control layer functions, while the OSD decoder primarily handles graphics layer functions. The routine 600 begins with step 602 and proceeds to step 604. The CPU detects, at step 604, the type of transmission being received. Specifically, the CPU detects whether the transmission is a movie or a navigator applet. An applet is identified by the video packet sequence containing a particular stream identification code, e.g., VIDEO ID 7. If the transmission is a movie, the video decoder begins, at step 606, decoding the movie. The movie decoding process is controlled by the CPU via step 656. At step 656, the CPU processes any movie presentation control commands generated by the remote control. As such, the CPU sends, at step 658, the presentation control command to the video session manager to facilitate changing the presentation. The routine ends at step 660.

If, at step 604, an applet is detected, the routine awaits, at step 608, for the applet leader. At step 610 and 612, the set top terminal CPU initializes the decoder and sets certain buffer pointers. In particular, the applet contains a video stream having VIDEO ID 7 carrying the OSD graphics, an audio stream having AUDIO ID 7 carrying the applet control instructions, and a video stream carrying the background video. To process these applet components, the CPU must store the OSD graphics and the instructions in special memory locations to avoid interference with the normal operation of the video decoder. As such, at steps 610 and 612, the CPU initializes the decoder's VIDEOID stream ID to 7 and sets the video stream select (VSS) bit. The OSD data is delimited by a user packet that indicates that the OSD data download is complete. Further, the CPU sets a video input buffer pointer to an OSD region of the decoder DRAM. As such, all video packets having an ID of 7 are routed to the OSD region of the memory. Similarly, the set top terminal CPU initializes the decoder AUDIOID stream ID to 7 and sets the audio stream select enable (ASE) bit. Also, the audio input buffer pointer is set to a temporary memory location of the decoder DRAM. This storage location is temporary because the instructions carried in the AUDIO ID 7 packets are ultimately copied to the CPU DRAM for execution.

At step 616, the routine queries whether an excessive amount of time has elapsed between detection of an applet and reception of the applet. If the query is affirmatively answered, the set top terminal sends, at step 618, a negative acknowledgment (NAQ) signal through the back channel to the video session manager. The routine ends at step 620. Upon receiving the NAQ signal, the video session manager will resend the applet.

If the query at step 616 is negatively answered, the routine proceeds to step 622. At step 622, the set top terminal begins receiving the applet, i.e., the CPU detects the user data packet. At step 624, the routine queries whether an excessive amount of time has elapsed between detection of a user data packet and reception of the data. If the query is affirmatively answered, the set top terminal sends, at step 626, a negative acknowledgment (NAQ) signal through the back channel to the video session manager. The routine ends at step 628. Upon receiving the NAQ signal, the video session manager will resend the applet.

At step 630, the control instructions within packets carrying AUDIOID 7 are extracted from the packets and stored in the CPU DRAM. At step 632, forward error correction is performed on the extracted bits. Additionally, at step 634, a check sum is created to ensure that the extracted control instructions are correct. At step 636, the CPU queries whether the check sum was correct. If the check sum is correct, the routine proceeds to step 642. However, if the query is negatively answered, the routine sends a NAQ to the video session manager and ends at step 640 to await retransmission of the applet.

At step 642, the OSD data within packets having a VIDEOID 7 are extracted from the packets and stored in the OSD region of the decoder DRAM. The payload of these packets is one or more bitmap images to be used by the applet. The OSD images are loaded directly into the start of the OSD data space. Subsequent packets (for VIDEOID 7) contain consecutive portions of the OSD image(s). An OSD image compiler leaves space at the beginning of each packet for actual MPEG synchronization codes. To indicate the end of the OSD transmission, a "user data" packet of up to 96 bytes in length is inserted into the video stream between the OSD packet stream and the background video stream.

At step 644, the CPU resets the video decoder to enable it to receive the background video transmission. At step 646, the video decoder begins to decode the background video and display that navigator imagery to the subscriber. The OSD overlays are also processed by the decoder and displayed in accordance with the descriptor file for the menu being displayed.

At step 648, the routine processes navigator commands from the remote control. These commands include all those associated with an applet with assets as well as an applet without assets. Note that an applet without assets has a single return button displayed for selection. Thus, the joystick is disabled, but the select function operates in the same manner as an applet with assets. At step 648, the CPU processes the three types of navigator commands: local set top terminal commands such as on/off, volume, channel selection; joystick directional vectors; and region selection. The vectors are processed to determine which region should next be highlighted. When a selection is made, the CPU sends, at step 650, a command to the video session manager to facilitate the transmission of a movie or applet.

At step 652, to facilitate a transition, the routine freezes the background video and prepares the set top terminal for the next applet or video transmission. In addition, the CPU executes a latency masking process as disclosed in commonly assigned U.S. patent application Ser. No. 08/738,361 filed Oct. 25, 1996. The applet ends at step 654.

Although many OSD graphics are sent within the VIDEOID 7 stream through the forward information channel, some OSD graphics are transmitted to the set top terminal through the command channel. Specifically, so-called "list screen" data is sent through the command channel. This data contains a textual list of characters to be used in a menu and is transmitted in ASCII form at the beginning of an applet transmission. The CPU converts the ASCII character list into OSD bitmap images and stores those images for subsequent use.

FIG. 7 depicts a flow diagram of a list information processing routine 700 for generating a list menu such as those depicted in FIGS. 4, 9, 15 and 19. The routine is executed by the CPU upon requesting a list menu. The routine begins at step 702 and proceeds to step 704. At step 704, the CPU receives a list menu from the service provider. The menu applet contains an instruction for the CPU to display page 0 of list text that forms the menu. The list text an ASCII page of text. The page 0 request is processed at step 706. At step 708, the routine queries whether page 0 is available in the CPU cache. If the query is negatively answered, the CPU requests the page 0 text from the service provider and awaits its arrival. If page 0 is available in the cache, the CPU retrieves and uses the cached page to generate the text menu (at step 711). The CPU converts the ASCII text into one or more OSD bitmap images using an EEPROM based font and kerning table. The CPU stores the OSD bitmap in the CPU DRAM. As the OSD lists are displayed, the CPU moves the necessary OSD graphic images to the video decoder OSD memory. The list menu is in the form of that shown in FIG. 4.

Such display is performed on a paginated basis. At step 712, the CPU monitors the remote control for a new selection, e.g., up arrow, down arrow, and select a particular region. If a down arrow is selected, the routine proceeds to step 714. At step 714, the routine queries whether the display is presently showing the last page of the list menu. If the query is affirmatively answered, the routine returns to step 712. If the query at step 714 is negatively answered, the routine proceeds to step 716 to determine whether the next subsequent page is cached. If the page is not cached, the CPU requests, at step 718, the next page from the service provider. The new page is used to form and display a list menu at step 719. Similarly, if an up arrow is selected, the routine checks if the previous page is in cache. If the page is in cache, the CPU uses the cached page. However, if the page is not available, the CPU requests the service provider to send the page.

If, at step 712, the routine detects that a region other than an up or down arrow is selected, the routine proceeds to step 722. At step 724, the routine processes the region selection in the same manner as described above for processing and displaying a new menu that is identified by the region selected. The routine ends at step 726.

The method and apparatus of the present invention provide an interactive menu structure (navigator) for an information distribution system such as a video-on-demand system. The navigator provides an enjoyable, interactive experience with full motion background video and active graphics that indicate when a selection is made by altering their appearance. All this functionality is brought to the set top terminal within an applet for each displayed menu. Consequently, the set top terminal does not require an expensive processor nor a large amount of memory. As such, the invention allows the set top terminal in an information distribution system to remain relatively inexpensive.

Although various embodiments which incorporate the teachings of the present invention have been shown and described in detail herein, those skilled in the art can readily devise many other varied embodiments that still incorporate these teachings.

What is claimed is:

1. A system for providing menu structures for interactive information distribution systems, comprising:
provider equipment for storing a plurality of logically linked applets, each of said applets defining a graphical layer, a video layer and a control layer, said control layer of each respective applet logically linking a graphical layer object to another applet, the provider equipment being in an interactive information distribution system; and
subscriber equipment for executing said applets, the subscriber equipment being within said interfactive information distribution system.

2. The system of claim 1, wherein said graphical layer comprises a plurality of graphical objects, each of said graphical objects being logically linked to a respective applet via said control layer.

3. The system of claim 1, wherein:
said subscriber equipment generating an image representative signal which, when processed by a display device, results in the display of:
said graphics layer, for displaying one or more graphical objects, said graphical objects being associated with respective applets stored in provider equipment, said applets comprising menu information and associated image information;
said video layer, for displaying still or moving images, including still or moving images generated using said applet image information; and
said control layer, coupled to said graphics layer and said video layer, for generating an applet request in response to a selection of a graphical object.

4. In an interactive information distribution system comprising provider equipment and subscriber equipment in communication via a network, a method comprising:
transmitting, to said subscriber equipment from said provider equipment, a first applet defining a graphical layer, a video layer and a control layer, said control layer logically linking a graphical layer object to a second applet stored in said provider equipment; and
in response to subscriber interaction indicative of the selection of said graphical layer object transmitting said second applet to said subscriber.

5. The method of claim 4, wherein said subscriber equipment receives and processes a single applet to provide, upon a display device, a graphical layer and a video layer, said control layer being responsive to user manipulation of graphical objects to select for download to said subscriber an applet associated with a selected graphical object.

6. The method of claim 4, wherein:
said graphical layer includes at least one graphical object representative of said logically linked applets, said video layer provides a contextual anchor relating to said applets and said control layer operates to logically link said graphical objects to said other applets.

7. A system for providing menu structures for interactive information distribution systems, comprising:
a video layer forming background video of guide page and comprising a plurality of title objects, wherein the video layer is derived from a video stream received from a transmission source;
a graphics layer comprising a plurality of overlay objects selectively overlaying said video layer, wherein each of the overlay objects is associated with a respective title object in the video layer and is selectively controlled to visually emphasize or de-emphasize a title object in the video layer of said guide page; and
a control layer for controlling generation of the video and graphics layers, said video, graphics, and control layers being defined by an applet originating at said transmission source, and said overlay objects of said graphics layer being logically associated with another applet at said transmission source.

8. The system of claim 7, wherein an opacity level of each overlay object is adjustable to visually emphasize or de-emphasize the associated title object.

9. The system of claim 7, wherein a color of each overlay object is adjustable to visually emphasize or de-emphasize the associated title object.

10. The system of claim 7, wherein de-emphasized title objects are substantially hidden from view.

11. The system of claim 7, wherein the overlay objects are selectively controlled to hide or reveal the associated title objects.

12. The system of claim 7, wherein emphasized tide objects are depicted as high intensity objects on the guide page and de-emphasized title objects are depicted as low intensity objects.

13. The system of claim 7, wherein an amount of de-emphasize for each title object is adjustable in discrete increments.

14. The system of claim 7, wherein at least one of the overlay objects in the graphics layer is a transparent overlay that does not visually alter the associated title object.

15. The system of claim 7, wherein each overlay object in the graphics layer is implemented as a bar having a particular shape.

16. The system of claim 7, wherein each overlay object in the graphics layer is implemented as horizontal bar.

17. The system of claim 7, wherein each overlay object is associated with a particular x-y coordinate.

18. The system of claim 7, wherein each title object in the video layer represents a program in a listing of programs.

19. The system of claim 18, wherein the listing of programs includes prior, current, or future time programming, or a combination thereof.

20. The system of claim 7, wherein each title object is associated with a respective program for a particular channel and time slot.

21. The system of claim 20, wherein title objects not associated with a desired time slot are masked by controlling the associated overlay objects.

22. The system of claim 7, wherein each title object corresponds to a manipulable object within the video layer.

23. The system of claim 7, wherein the title objects in the video layer are visually emphasized or de-emphasized in response to user manipulations via a remote control unit.

24. The system of claim 7, wherein the overlay objects in the graphics layer are controlled locally at a set top terminal.

25. The system of claim 7, wherein the graphics layer is modified in response to a user command.

26. The system of claim 7, wherein the graphics layer is derived based in part on data received from the transmission source.

27. The system of claim 7, wherein the graphics layer is generated at the transmission source and received via one or more streams.

28. The system of claim 7, wherein the overlay objects are arranged in the graphics layer based on overlay parameters received from the transmission source.

29. The system of claim 7, wherein the graphics layer is generated locally at a set top terminal.

30. The system of claim 7, wherein the graphics layer is generated using one or more bitmaps.

31. The system of claim 30, wherein the one or more bitmaps are pre-programmed at a set top terminal.

32. The system of claim 30, wherein the one or more bitmaps are updatable at a set top terminal.

33. The system of claim 30, wherein the one or more bitmaps are synchronized to the video layer via signaling sent via a data delivery means.

34. The system of claim 7, wherein the graphics layer includes an icon representative of a particular channel selected for processing.

35. The system of claim 7, wherein an emphasized title object can be selected to retrieve a video stream or an audio stream, or both, associated with the emphasized title object.

36. The system of claim 7, wherein an emphasized title object can be selected to change a level of abstraction, wherein each of a plurality of possible levels of abstraction defines a particular manner in which data is presented on the program guide page.

37. The system of claim 36, wherein the plurality of levels of abstraction include an interaction model that includes manipulations requiring no interaction with the transmission source.

38. The system of claim 36, wherein the plurality of levels of abstraction include an interface model that includes manipulations requiring interaction with the transmission source.

39. The system of claim 36, wherein the plurality of levels of abstraction include a contextual level indicative of replacement of the video layer in response to a user command.

40. A system for providing menu structures for interactive information distribution systems, comprising:
a video layer comprising a plurality of title objects, wherein each title object is associated with a particular channel and time slot, and wherein the video layer is derived from a video stream received from a service provider transmission source;
a graphics layer comprising a plurality of overlay objects selectively overlaying said video layer, wherein each overlay object is associated with a respective title object in the video layer and is selectively controlled to hide or reveal the associated title object; and
a control layer for controlling generation of the video and graphics layers, said video, graphics, and control layers being defined by an applet originating at said transmission source, and said overlay objects of said graphics layer being logically associated with another applet at said transmission source.

41. The system of claim 40, wherein the video layer includes title objects for a plurality of time slots, and wherein tide objects corresponding to a selected time slot are revealed and title objects corresponding to remaining time slots are hidden from view.

42. The system of claim 40, wherein the video layer is divided into a plurality of regions including a guide region and a video region.

43. The system of claim 42, wherein the plurality of regions further includes a program description region used to display program information for a particular program.

44. The system of claim 42, wherein the guide region presents a listing of programs and is generated at the transmission source.

45. A system for providing menu structures for interactive information distribution systems, comprising:
a video layer comprising a guide region and a video region, wherein the guide region includes a plurality of title objects, and wherein each title object is associated with a particular channel and time slot;
a graphics layer comprising a plurality of overlay objects selectively overlaying said video layer, wherein each overlay object is associated with a respective title object in the video layer and is selectively controlled to emphasize or de-emphasize the associated title object shown in an interactive program guide(IPG) page; and
a control layer for controlling generation of the video and graphics layers, said video, graphics, and control layers being defined by an applet originating at a transmission source, and said overlay objects of said graphics layer being logically associated with another applet at said transmission source.

46. The system of claim 45, wherein the video layer further includes a plurality of icons representative of a plurality of user selectable options.

47. The system of claim 45, wherein the video layer further includes a program description region.

48. The system of claim 45, wherein a first set of one or more title objects in the guide region is emphasized and a second set of one or more title objects in the guide region is de-emphasized.

49. The system of claim 45, wherein the title objects in the guide region and the overlay objects in the graphics layer are generated at a transmission source.

50. The system of claim 45, wherein the title objects in the guide region are generated at a transmission source and the overlay objects in the graphics layer are generated locally at a set top terminal.

51. A method for providing an interactive program guide (IPG) page at a set top terminal, the method comprising:
receiving a video stream comprising a control layer and a video layer defined by an applet originating from a transmission source;
executing the received control layer for controlling presentation of said video layer and a graphics layer;
processing the received video stream to provide a video layer for the IPG page, wherein the video layer includes a plurality of title objects, and wherein each title object is associated with a respective channel and time slot;
presenting said graphics layer having included therein a plurality of overlay objects displayed over said video layer, wherein each overlay object is associated with a respective title object in the video layer and is selectively controlled to visually emphasize or de-emphasize the associated title object; and
associating a selected overlay object of said graphics layer to another applet at said transmission source.

52. The method of claim 51, further comprising:
merging the video layer with the graphics layer to provide an output video.

53. The method of claim 51, wherein the video and graphics layers are generated at the transmission source.

54. The method of claim 51, wherein the video layer is generated at the transmission source and the graphics layer is generated locally at the set top terminal.

55. The method of claim 51, further comprising:
receiving a user command to change emphasis on one or more title objects; and
modifying the graphics layer in response to the user command.

56. The method of claim 51, further comprising:
receiving a user command selecting a particular title object; and
processing a stream associated with the particular title object to retrieve selected information.

57. The method of claim 51, further comprising:
receiving a command to change a level of abstraction; and
changing the level of abstraction in response to the received command, and wherein each of a plurality of possible levels of abstraction defines a particular manner in which data is presented on the IPG page.

58. A method for providing a guide page at a set top terminal, the method comprising:
receiving a first stream comprising a control layer and a video layer defined by an applet originating from a transmission source;
executing the received control layer for controlling presentation of said video layer and a graphics layer;
processing the first stream to provide said video layer for the guide page, wherein the video layer includes a plurality of title objects;
receiving a second stream from the transmission source;
processing the second stream to provide said graphics layer for the guide page, wherein the graphics layer includes therein a plurality of overlay objects that are displayed over said video layer, and wherein each overlay object is associated with a respective title object in the video layer and is selectively controlled to visually emphasize or de-emphasize the associated title object; and
associating a selected overlay object of said graphics layer to another applet at said transmission source.

59. The method of claim 58, further comprising:
receiving a user command to emphasize or de-emphasize a particular title object; and modifying the graphics layer in response to the user command.

60. The method of claim 59, wherein the modifying is performed locally at a receiving device.

61. The method of claim 58, further comprising:
receiving a user command for a particular selection; and
sending a request to the transmission source for additional data if the user request cannot be processed based on available data at a set top terminal.

62. A set top terminal (STT) operative to provide an interactive program guide (IPG) page, comprising:
a demodulator operative to receive a modulated signal including a control layer and a video layer of the IPG page, and provide a transport stream;
a transport de-multiplexer coupled to the demodulator and operative to receive and process the transport stream to provide a plurality of elementary streams;
a video decoder coupled to the transport de-multiplexer and operative to decode a first elementary stream to provide the video layer for the IPG page, wherein the video layer includes a plurality of title objects, and wherein each title object is associated with a respective channel and time slot in a program guide listing;
an on-screen display (OSD) processor operative to provide a graphics layer having included therein a plurality of overlay objects for display over said video layer, wherein each overlay object is associated with a respective title object in the video layer and is selectively controlled to visually emphasize or de-emphasize the associated title object;
a controller coupled to said video decoder and the OSD processor, and operative to process said control layer to define presentation of the video layer and the graphics layer displayed over the video layer, said video, graphics, and control layers being defined by an applet originating at a transmission source, and said overlay objects of said graphics layer being logically associated with another applet at said transmission source; and
a compositor coupled to the video decoder and the OSD processor and operative to combine the video layer with the graphics layer to provide the IPG page.

63. The STT of claim 62, wherein the controller is operative to receive a user command and, in response, modifies a signal provided to the OSD processor to change presentation of an overlay object.

64. The STT of claim 62, wherein the controller includes a storage element operative to store one or more bitmaps used to produce the graphics layer.

* * * * *

UNITED STATES PATENT AND TRADEMARK OFFICE
CERTIFICATE OF CORRECTION

| | | |
|---|---|---|
| PATENT NO. | : 7,032,176 B2 | Page 1 of 1 |
| APPLICATION NO. | : 09/781483 | |
| DATED | : April 18, 2006 | |
| INVENTOR(S) | : Donald Gordon et al. | |

It is certified that error appears in the above-identified patent and that said Letters Patent is hereby corrected as shown below:

On the face page, in field (73), "Assignee," delete "Sedna Patent Serivces, LLC" and insert --Sedna Patent Services, LLC--.

In column 2, line 31, delete "co" and insert --to--.

In column 5, line 62, delete "(PAM)" and insert --(RAM)--.

In column 11, line 18, below "<FOCUS ASC=Up ON=Up>" delete " "<BMP NAME=DownInfo FILE=/ms/bmp/list_d[]2 Xz88"

In column 17, line 12, "interfactive" and insert --interactive--.

In column 17, line 42, after "object" insert --,--.

In column 18, line 18, delete "tide" and insert --title--.

In column 19, line 51, delete "tide" and insert --title--.

Signed and Sealed this

Fifteenth Day of August, 2006

JON W. DUDAS
*Director of the United States Patent and Trademark Office*